United States Patent
Kondo et al.

(10) Patent No.: US 6,957,138 B2
(45) Date of Patent: Oct. 18, 2005

(54) TRAVEL CONTROL APPARATUS OF VEHICLE

(75) Inventors: Toshiyuki Kondo, Kariya (JP); Mamoru Sawada, Yokkaichi (JP); Motoaki Kataoka, Kariya (JP)

(73) Assignee: DENSO Corporation, Kariya (JP)

(*) Notice: Subject to any disclaimer, the term of this patent is extended or adjusted under 35 U.S.C. 154(b) by 0 days.

(21) Appl. No.: 10/292,591

(22) Filed: Nov. 13, 2002

(65) Prior Publication Data

US 2003/0093210 A1 May 15, 2003

(30) Foreign Application Priority Data

Nov. 15, 2001 (JP) ........................................ 2001-350351
Aug. 20, 2002 (JP) ........................................ 2002-239329

(51) Int. Cl.[7] ................................................ B60T 7/12
(52) U.S. Cl. .................................................... 701/96
(58) Field of Search ............................ 701/27, 40, 44, 701/56–59, 77, 93, 95–96, 98, 106; 706/905, 913

(56) References Cited

U.S. PATENT DOCUMENTS

| 5,414,625 A | 5/1995 | Hattori |
| 5,611,753 A | * 3/1997 | Kondo et al. ................ 477/118 |
| 6,102,002 A | 8/2000 | Gimmler et al. |
| 6,580,987 B2 | * 6/2003 | Sadano et al. ................ 701/41 |

FOREIGN PATENT DOCUMENTS

| JP | 2-3755 | 1/1990 |
| JP | 7-17346 | 1/1995 |
| JP | 7-108849 | 4/1995 |
| JP | 2001/163236 | 6/2001 |
| JP | 2001-310650 | 11/2001 |

\* cited by examiner

*Primary Examiner*—Thu V. Nguyen
(74) *Attorney, Agent, or Firm*—Nixon & Vanderhye P.C.

(57) ABSTRACT

A vehicle travel control apparatus makes an own vehicle automatically follow a vehicle in front by setting a target acceleration/deceleration G0 using travel data expressing behavior of the vehicle, travel environment, driving operations and others. Here, during vehicle travel based on driver control, multiple travel data are sampled a predetermined number of times to perform multiple regression analysis on that sampled data. Preference data expressing preferences of the driver (multiple regression coefficients) are thereby obtained, and target acceleration/deceleration computation data are updated using these multiple regression coefficients. As a result, it is possible to control the behavior of the vehicle in accordance with preferences of the driver during automatic following control execution.

15 Claims, 18 Drawing Sheets

$G0 = 0.15 \times VR + 0.04 \times \Delta D$ $a1 = 0.15$

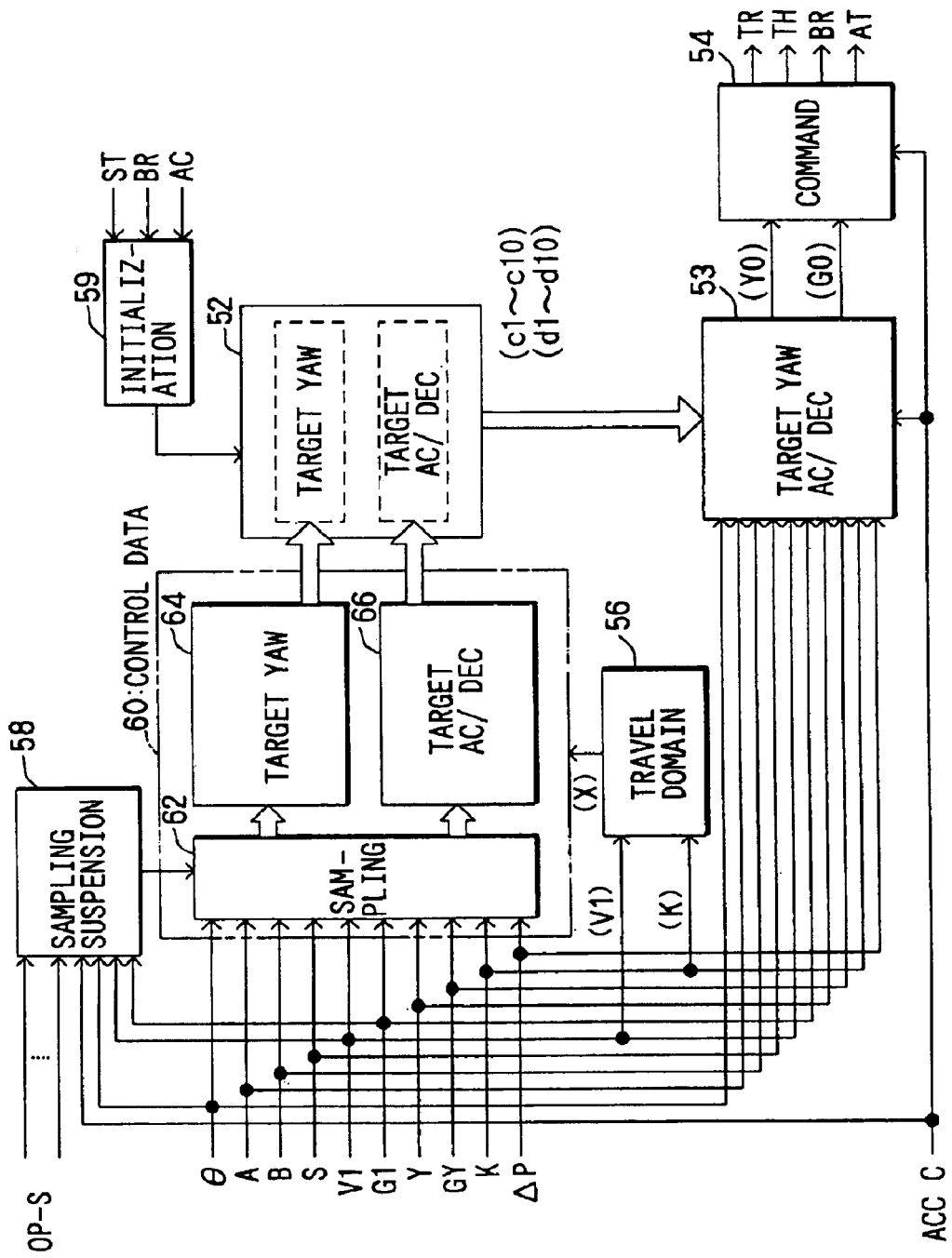

TRAVEL CONTROL APPARATUS OF VEHICLE

CROSS REFERENCE TO RELATED APPLICATION

This application is based on and incorporates herein by reference Japanese Patent Applications No. 2001-350351 filed on Nov. 15, 2001 and No. 2002-239329 filed on Aug. 20, 2002.

FIELD OF THE INVENTION

This invention relates to a travel control apparatus of a vehicle for proxying/assisting driving of a driver, and particularly to a travel control apparatus of a vehicle suitable for reflecting preferences of the driver in travel control.

BACKGROUND OF THE INVENTION

Travel control apparatuses of a vehicle for proxying/assisting driving of a driver have been known, such as for example automatic following control apparatuses for making a vehicle follow a vehicle in front by automatically controlling an engine, an automatic transmission, a brake device and so on without reference to driving operations of the driver. Other instances are automatic steering apparatuses for controlling a tire angle so that the vehicle travels along a travel lane of the road, and automatic garage parking apparatuses for carrying out parking of a car by automatically controlling the engine, brake device and steering device and so on.

In a travel control apparatus of this kind, it is aimed that the vehicle to be controlled so that the travel state of the vehicle during proxying/assisting driving of the driver becomes a travel state of the liking of the driver. For that purpose, the idea is considered of setting, during travel control execution, control targets in correspondence with the result of learning. Here the learning is to learn relationship between the travel state during normal travel based on driving operations of the driver (the behavior of the vehicle itself, such as the vehicle speed, front-rear direction acceleration, and yaw rate), and the travel environment around the vehicle.

For example, in JP-A-H7-108849, the idea is disclosed of causing a vehicle to travel automatically as follows: during normal travel based on driving operations of a driver, learning the relationship between the travel state of the vehicle and the environment state around the vehicle; and during execution of vehicle travel control, setting an environment state (control target) preferred by the driver from the results of that learning and the travel state of the vehicle, and obtaining control amounts of the vehicle so that the actual environment state becomes the control target.

However, in a related art travel control apparatuses of this kind, in reflecting preferences of the driver in travel control, simply the relationship between one travel state and one travel environment is learned, as in the relationship between the vehicle speed and an inter-vehicle distance or the relationship between the vehicle speed and the road width. Therefore the preferences of the driver cannot be fully reflected in the control results, and sometimes the driver was given a sense of incongruity.

In the above-mentioned publication, during normal travel of the vehicle, the vehicle speed and the inter-vehicle distance are sampled and preferences of the driver are learned by single regression analysis with the sampled vehicle speed as an explanatory variable and the inter-vehicle distance as a target variable. During execution of travel control, a target inter-vehicle distance is set corresponding to the present vehicle speed in accordance with that learning result. The vehicle is thereby controlled so that the inter-vehicle distance between the own vehicle and the vehicle in front becomes this target inter-vehicle distance.

Here, the target inter-vehicle distance can be set to a distance corresponding to the preferences of the driver in travel control based on learning results obtained by a single regression analysis of this kind. However, the vehicle acceleration/deceleration in a case where the inter-vehicle distance is being controlled to the target inter-vehicle distance and the responsiveness in a case where the vehicle is accelerated/decelerated cannot be made to correspond with the preferences of the driver.

SUMMARY OF THE INVENTION

An object of the invention is to make it possible for a behavior of the vehicle during travel control to be controlled optimally in accordance with preferences of a driver.

To achieve the object, a vehicle travel control apparatus detects three or more types of travel data including a behavior of the vehicle during vehicle travel. It otherwise detects in addition to this behavior at least one of a driving operation of a driver and a travel environment of the vehicle. During non-control of a control object by it, it samples all the detected travel data. It then digitizes a plurality of preferences of the driver during vehicle travel by performing multiple regression analysis. Here one of the behaviors of the vehicle of the travel data is treated as a target variable while the other travel data are treated as explanatory variables. It computes a control target of the target variable on the basis of the explanatory variables and the digitized preference data. It thus controls the control object so that the target variable becomes that control target.

BRIEF DESCRIPTION OF THE DRAWINGS

The above and other objects, features and advantages of the present invention will become more apparent from the following detailed description made with reference to the accompanying drawings. In the drawings:

FIG. 17 is a function block diagram showing functions of a LMC (lane maintenance control) ECU of the third embodiment.

DETAILED DESCRIPTION OF THE EMBODIMENT

[First Embodiment]

Figure 1:
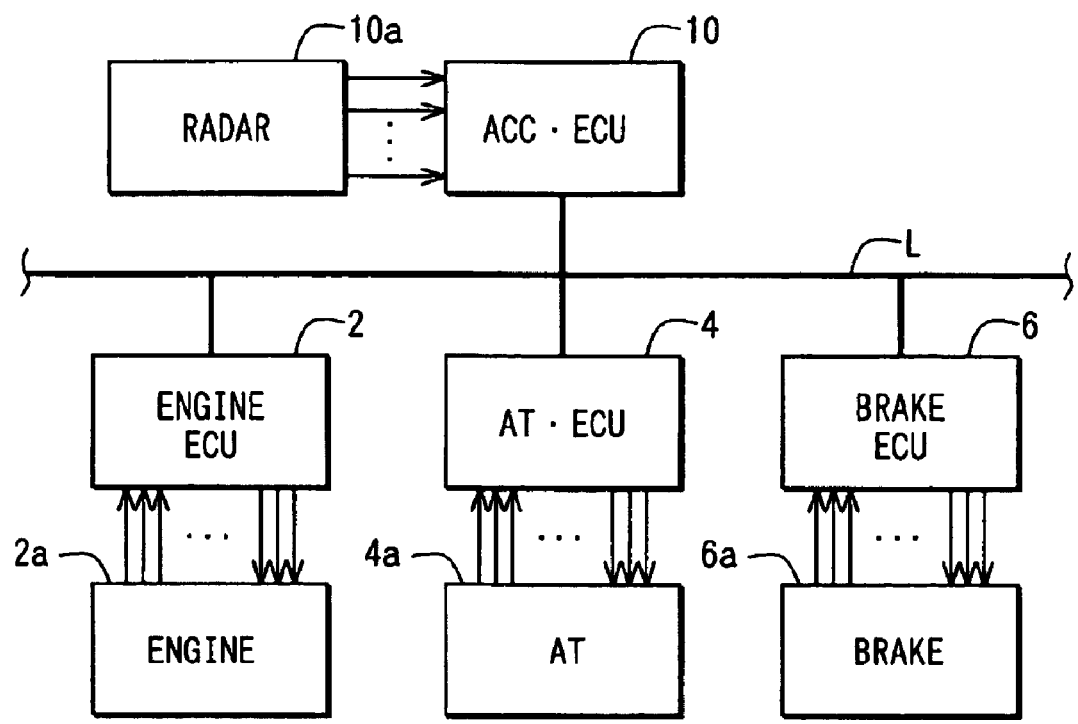
FIG. 1 is a system diagram showing the overall structure of a travel control apparatus of a first embodiment.

A travel control apparatus of a first embodiment shown in FIG. 1 performs an adaptive cruise control (ACC), in accordance with ACC execution command from a driver, to cause an own vehicle to travel following a vehicle in front. It is mainly composed of an ACC electronic control unit (ECU) 10.

This ACC ECU 10 has a radar device 10a. The radar device 10a detects an inter-vehicle distance D and a relative vehicle speed VR, which show the relative travel states of the own vehicle and the vehicle in front. It also detects the speed of the vehicle in front (vehicle in front speed) V2 and the front-rear direction acceleration/deceleration of the vehicle in front (vehicle in front acceleration/deceleration) G2, which show behavior of the vehicle in front.

And, the ACC ECU 10 is connected via a communication line L to other ECUs such as an engine ECU 2, an automatic transmission (AT) ECU 4 and a brake ECU 6. It constitutes a vehicle control system network (a so-called in-vehicle LAN) together with the other ECUs.

The ACC ECU 10 acquires, from the other ECUs to which it is connected via the communication line L, travel data as follows: an own vehicle speed (own speed) V1 and a front-rear direction acceleration/deceleration (own acceleration/deceleration) G1, which express the behavior of the own vehicle during travel; a steering angle (wheel angle) θ, which expresses an amount of operation by the driver while driving of the vehicle; and a road gradient α and a road curvature K, which express the travel environment around the vehicle. The ACC ECU 10 then executes control processing for the ACC using these travel data G1, V1, θ, α, K and the above-mentioned travel data D, VR, V2, G2 obtained using the radar device 10a.

Specifically, when an ACC execution command is inputted from the driver, the ACC ECU 10 obtains as a control target a target acceleration/deceleration necessary for making the own vehicle follow the vehicle in front. It sets a throttle valve opening angle (throttle opening angle) of an engine 2a, a speed change step (AT speed change step) of an automatic transmission (AT) 4a, and a brake pressure of a braking device (brake device) 6a required for controlling the acceleration/deceleration of the own vehicle to the target acceleration/deceleration. It then transmits these as control data to the engine ECU 2, the AT ECU 4 and the brake ECU 6.

The engine ECU 2 opens and closes a throttle valve of the engine 2a in accordance with accelerator operation by the driver. It executes known engine control including controlling fuel injection amounts supplied by injection to cylinders of the engine 2a and ignition timing on the basis of the running state of the engine (the intake air flow or intake manifold pressure, which change in correspondence with the throttle opening angle, the engine speed, the intake air temperature, the exhaust gas temperature, the cooling water temperature, the oxygen concentration of exhaust gas, etc.). When the engine ECU 2 receives an ACC execution command from the driver, irrespective of accelerator operation by the driver, it opens and closes the throttle valve to automatically drive the engine 2a in accordance with control data. The control data is transmitted from the ACC ECU 10 via the communication line L.

The AT ECU 4 executes known speed change control and lock-up control for controlling the speed change step of the automatic transmission 4a in accordance with a pre-set speed change pattern and, as necessary, joining input/output shafts of a torque converter constituting the automatic transmission 4a. When the AT ECU 4 receives an ACC execution command from the driver, it controls the speed change step of the AT 4a in accordance with control data (speed change steps) transmitted to it from the ACC ECU 10 via the communication line L.

The brake ECU 6 produces brake pressure and deceleration of the vehicle to make the vehicle decelerate automatically in accordance with commands even during non-operation of the brake pedal. And when the brake ECU 6 receives an ACC execution command from the driver, even if brake operation is not being carried out by the driver, it controls the brake pressure and applies a braking force to the vehicle in accordance with control data (a deceleration) transmitted to it from the ACC ECU 10 via the communication line L.

The above-mentioned ECUs 2, 4, 6, 10 are constructed around microcomputers having a communication capability, and the above-mentioned controls are realized by computational processing of the microcomputers.

Besides the ECUs 2, 4, 6, 10, other ECUs for proxying/assisting driving of the vehicle by the driver are also connected to the communication line L, separately from the ACC ECU 10, such as for example an ECU for traction control and an ECU for attitude control. The ECU for traction control is for suppressing the output of the engine 2a and applying a braking force to driving wheels by way of the brake device 6a to suppress slip of the driving wheels occurring when the vehicle is accelerating or starting off. The ECU for attitude control is for stabilizing the vehicle body attitude by controlling the output of the engine 2a and applying braking forces to any wheels by way of the brake device 6a when the vehicle is acc/decelerating or turning.

When these ECUs transmit control data, the engine ECU 2 and the brake ECU 6 also control the engine 2a and the brake device 6a in accordance with the control data.

Figure 2:
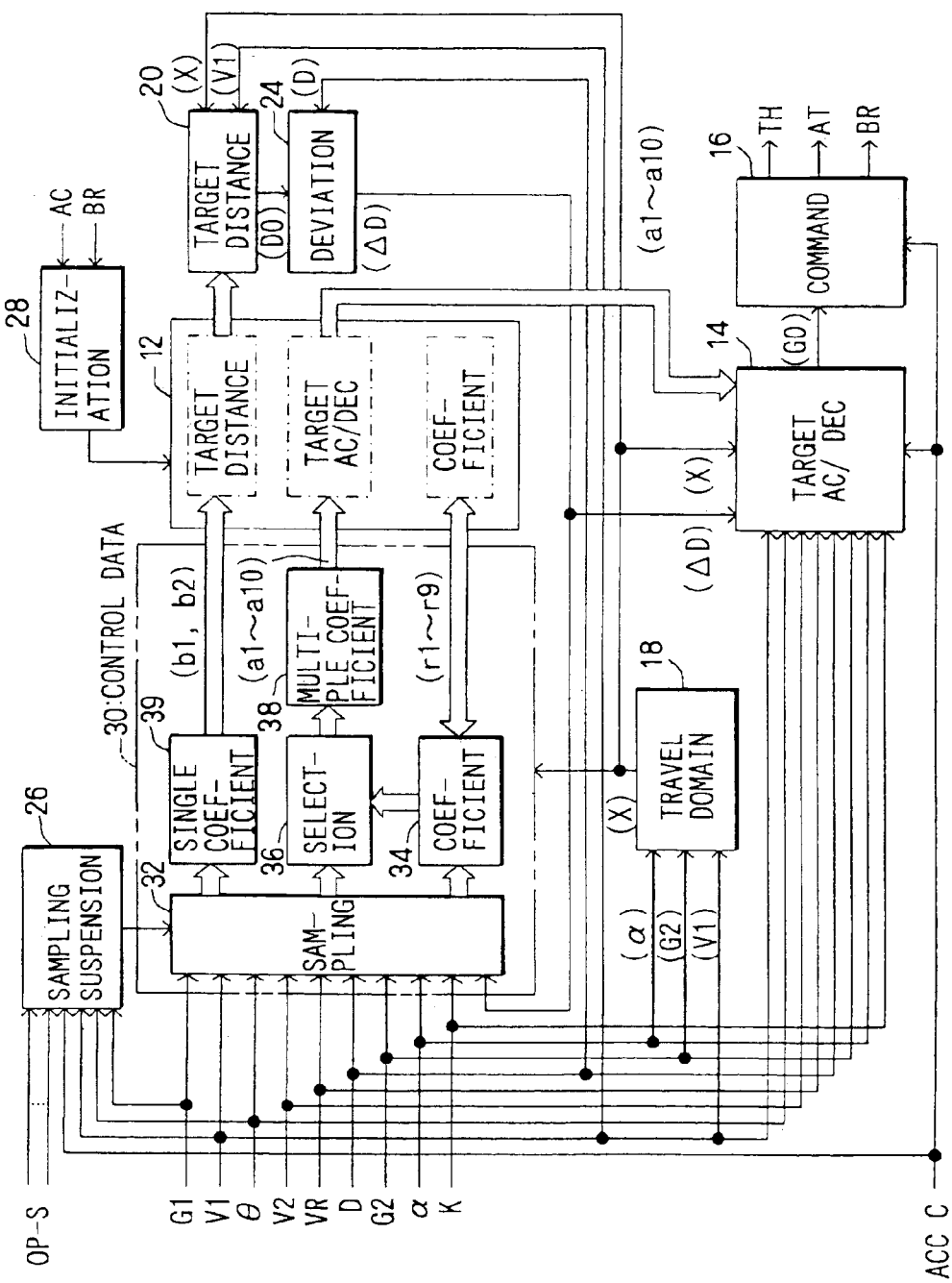
FIG. 2 is a function block diagram showing functions of an ACC (adaptive cruise control) ECU of the first embodiment.

Next, FIG. 2 is a function block diagram showing various functions with which the ACC ECU 10 is provided for executing ACC. The functions shown in FIG. 2, in practice, are realized by the microcomputer of the ACC ECU 10 executing control data computation processing and target acceleration/deceleration computation processing which will be discussed later.

As shown in FIG. 2, the ACC ECU 10 has a control data storing part 12 for storing different kinds of control data needed for executing the ACC.

This control data storing part 12, in practice, is realized by a memory of the microcomputer constituting the ACC ECU 10. It stores data b1 and b2, data a1 to a10 and single correlation coefficients r1 to r9 in correspondence with travel domains X made by dividing up the overall travel domain of the vehicle into a plurality (in this embodiment, eight). The data b1, b2 are for a target inter-vehicle distance computation in correspondence with a preference of the driver according to the own vehicle speed V1. The data a1 to a10 are for computation of a target acceleration/deceleration which is a control target during the ACC execution. The single correlation coefficients r1 to r9 are used for target acceleration/deceleration computation in a control data computation part 30 which will be discussed later.

These control data are updated by operation of the control data computation part 30 which will be described later, but initial values prior to updating of these control data are also stored in the control data storing part 12.

And, of these control data, control data updated by the control data computation part 30 are stored in backup RAM receiving the power supply or ROM (EEPROM or the like) with which rewriting of data is possible. The control data thereby remain even when the power supply to the ACC ECU 10 is off. The initial values of the control data are in contrast stored in the same ROM as programs executed by the microcomputer.

Next, the target acceleration/deceleration computation data a1 to a10 stored in the control data storing part 12 are inputted to a target acceleration/deceleration computation part 14 which operates when an ACC execution command is inputted from the driver. The target inter-vehicle distance computation data b1, b2 are inputted to a target inter-vehicle distance computation part 20.

And, the ACC ECU 10 is provided with a vehicle travel domain determination part 18 for determining to which of the eight preset travel domains X (domains 1 to 4, 1' to 4') the present travel state of the vehicle belongs, on the basis of the own vehicle speed V1, the vehicle in front acceleration/deceleration G2 and the road gradient α. A determination result (a travel domain X) from this vehicle travel domain determination part 18 is also inputted to the target acceleration/deceleration computation part 14 and the target inter-vehicle distance computation part 20.

Figure 3A:
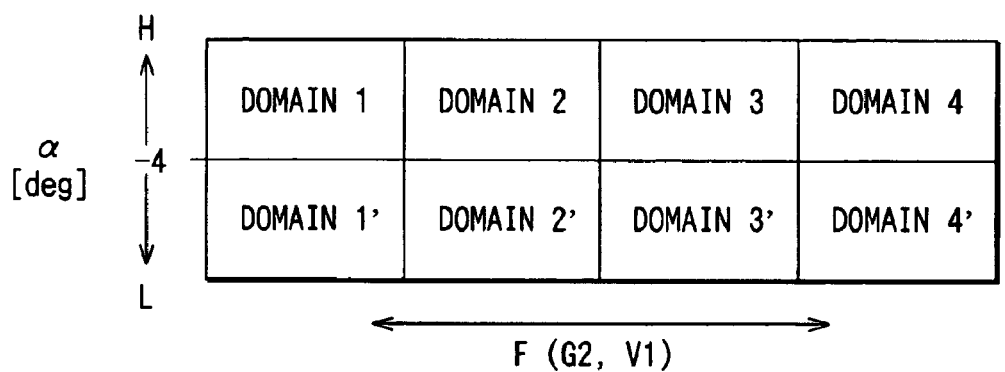
FIGS. 3A and 3B are explanatory diagrams explaining operations of a vehicle travel domain determination part of FIG. 2.

Here, the eight travel domains X (domains 1 to 4, 1' to 4') determined by the vehicle travel domain determination part 18 are preset as shown in FIG. 3A.

These eight travel domains are obtained by two divisions. The first is dividing the overall travel domain of the vehicle into two travel domains on the basis of whether the road gradient a, which is the travel environment, is less than −4[deg] (in other words, whether the vehicle is travelling downhill). The second is dividing each of these travel domains into four travel domains determined with the own vehicle speed V1 and the vehicle in front acceleration/deceleration G2 of when the vehicle is travelling. The vehicle travel domain determination part 18 hence determines which of the eight travel domains (domains 1 to 4, 1' to 4') the present vehicle travel domain X belongs to in accordance with change of these parameters.

Figure 3B:
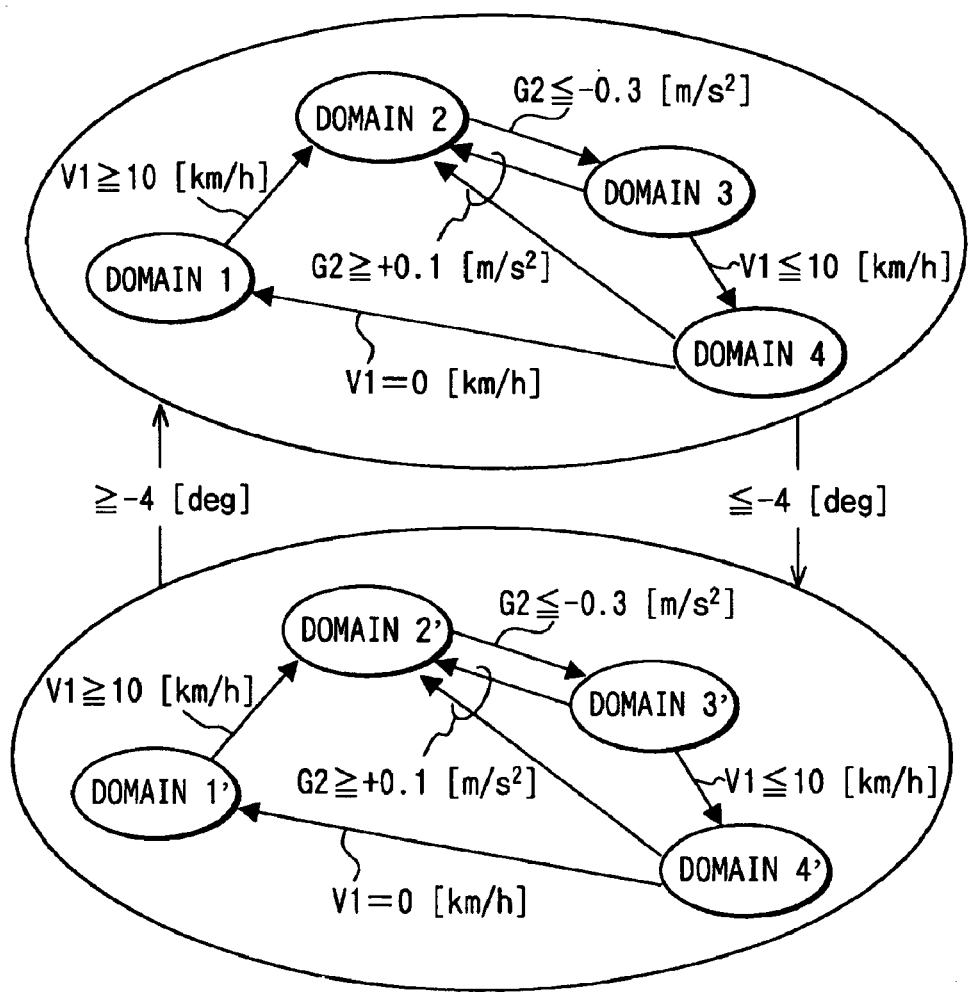

Specifically, as shown in FIG. 3B, the vehicle travel domain determination part 18 sets a travel domain X. In the travel domain where the road gradient α is greater than −4[deg], it sets the travel domain X as domains 1 to 4. The travel domain X is set as domain 1 in the state when the own vehicle is starting off and the own vehicle speed V1 is from 0[km/h] to 10[km/h] and is switched to domain 2 when the own vehicle speed V1 rises above 10[km/h]. When the travel domain X is domain 2 the vehicle in front enters deceleration running and the vehicle in front acceleration/deceleration G2 becomes below −0.3[m/s²], it is switched to domain 3. When in this domain 3 the vehicle in front starts to accelerate and the vehicle in front acceleration/deceleration G2 rises above +0.1[m/s²], the travel domain X is set to domain 2 again. When in the travel domain X is domain 3 the own vehicle speed V1 becomes below 10[km/h], the travel domain X is switched to domain 4. When in this domain 4 the vehicle shifts to a stopped state (own vehicle speed V1=10[km/h]), the travel domain returns to domain 1. Furthermore, when in domain 4 the vehicle in front starts to accelerate and the vehicle in front acceleration/deceleration G2 becomes over +0.1[m/s²], the travel domain X is switched to domain 2 again.

And as is clear from FIG. 3B, in a travel domain where the road gradient α is less than −4[deg], the vehicle travel domain determination part 18 sets the vehicle travel domain X to one of domains 1' to 4' in a similar order when the road gradient α is greater than −4[deg].

Next, the target inter-vehicle distance computation part 20 takes in from the control data storing part 12 target inter-vehicle distance computation data b1, b2 corresponding to the present travel domain X of the vehicle determined by the vehicle travel domain determination part 18. It then, using these and the own vehicle speed V1, calculates a target inter-vehicle distance D0 in accordance with the following expression (1).

$$D0 = b1 \times V1 + b2 \qquad (1)$$

And, this target inter-vehicle distance D0 calculated by the target inter-vehicle distance computation part 20 is inputted to an inter-vehicle distance deviation computation part 24. The inter-vehicle distance deviation computation part 24 calculates the deviation (D−D0) between this target inter-vehicle distance D0 and the present inter-vehicle distance D as an inter-vehicle distance deviation ΔD. It then outputs that computation result (the inter-vehicle distance deviation ΔD) as a piece of travel data to the target acceleration/deceleration computation part 14 and the control data computation part 30.

On the other hand, the target acceleration/deceleration computation part 14 takes in from the control data storing part 12 target acceleration/deceleration computation data a1 to a10 corresponding to the present travel domain X of the vehicle determined by the vehicle travel domain determination part 18. It then calculates a target acceleration/deceleration G0, which is a control target, using these data a1 to a10 and the inter-vehicle distance deviation ΔD calculated by the inter-vehicle distance deviation computation part 24 as a piece of travel data and the travel data V1, θ, V2, VR, D, G2, α and K, which are the travel data acquired from the radar device 10a or other ECUs excluding the own vehicle acceleration/deceleration G1, in accordance with the following expression (2).

$$G0 = a1 \times V1 + a2 \times \theta + a3 \times V2 + a4 \times VR + \qquad (2)$$
$$a5 \times D + a6 \times \Delta D + a7 \times G2 + a8 \times \alpha + a9 \times K + a10$$

Then, that computation result (the target acceleration/deceleration G0) is inputted to a command value computation part 16. The command value computation part 16 sets in a preset order a throttle opening angle, an AT speed change step, and a brake pressure required for controlling the own vehicle acceleration/deceleration G1 to the target acceleration/deceleration G0. It then transmits these as control data to the engine ECU 2, the AT ECU 4 and the brake ECU 6. The command value computation part 16, like the target acceleration/deceleration computation part 14, operates when an ACC execution command has been inputted from the driver.

Next, the control data computation part 30 is for updating the target inter-vehicle distance computation data b1, b2 and the target acceleration/deceleration computation data a1 to a10 stored in the control data storing part 12. It updates according to an actual travel state of the vehicle based on driving operations of the driver, and operates in accordance with a determination result of a sampling suspension determining part 26.

The sampling suspension determining part 26 monitors the operating state of proxying/assisting apparatuses for proxying/assisting driving of the driver (this ACC ECU 10, or an ECU for traction control or the like) on the basis of in-operation signals (op-s) outputted from these apparatuses. It then prohibits, during their operation, digitization (specifically, sampling of travel data) carried out by the control data computation part 30. When all of these apparatuses are not operating (in other words, when the vehicle is being driven only by driving operations of the driver), it permits digitization by the control data computation part 30.

And, the sampling suspension determining part 26, on the basis of changes in the steering angle θ, the own vehicle speed V1 and the own vehicle acceleration/deceleration G1 and so on, determines whether the driver is performing a vehicle operation for emergency avoidance. When an emergency avoidance operation is being carried out, it prohibits digitization (specifically, sampling of travel data) by the control data computation part 30.

Then, in the control data computation part 30, if digitization is being permitted by the sampling suspension determining part 26, a sampling part 32 repeatedly samples with a predetermined period the travel data. These are G1, V1, θ, V2, VR, D, G2, α and K acquired from the radar device 10a or other ECUs and the inter-vehicle distance deviation ΔD calculated by the inter-vehicle distance deviation computation part 24.

The determination result of the vehicle travel domain determination part 18 is also inputted to the control data computation part 30, and the sampling part 32 samples the travel data G1, V1, θ, V2, VR, D, ΔD, G2, α and K in correspondence with the present travel domain X of the vehicle determined by the vehicle travel domain determination part 18.

And, when the sampling part 32 samples the travel data at a periodically produced sampling timing, for instance in some cases the vehicle in front cannot be detected by the radar device 10a and all the travel data cannot be sampled. In the cases, the sampling of the travel data at that sampling timing is stopped.

And next, the control data computation part 30 has a correlation coefficient calculating part 34, a data selection part 36 and a multiple regression coefficient calculating part 38. The correlation coefficient calculating part 34 is for taking in by travel domain X the travel data G1, V1, θ, V2, VR, D, ΔD, G2, α and K sampled by the sampling part 32. It is also for calculating for each travel domain X single coefficients of correlation r1 to r9 between the own vehicle acceleration/deceleration G1 and the other travel data V1, θ, V2, VR, D, ΔD, G2, α and K. The data selection part 36 is for selectively taking in by travel domain X the own vehicle acceleration/deceleration G1 and given travel data among the travel data by travel domain X sampled in the sampling part 32. Of the given travel data, the absolute value of the single correlation coefficient r calculated by the correlation coefficient calculating part 34 is above a predetermined value (for example 0.5). The multiple regression coefficient calculating part 38 is for updating the target acceleration/deceleration computation data by travel domain X using the travel data by travel domain X selectively taken in by the data selection part 36.

Here, the correlation coefficient calculating part 34 calculates the single coefficients of correlation r1 to r9 between the own vehicle acceleration/deceleration G1 and the other travel data V1, θ, V2, VR, D, ΔD, G2, α and K by travel domain X using travel data by travel domain X sampled in the sampling part 32. This is executed from when digitization by the control data computation part 30 is permitted by the sampling suspension determining part 26 until when it is next prohibited. The correlation coefficient calculating part 34 averages the single correlation coefficients r1 to r9 by travel domain X computed this time with the ones stored in the control data storing part 12. It then updates the single correlation coefficients r1 to r9 stored in the control data storing part 12 with the averaged ones as the new ones. It outputs them to the data selection part 36.

On the other hand, the multiple regression coefficient calculating part 38, basically, in accordance with the multiple regression model of the following expression (3). Here, of the travel data G1, V1, θ, V2, VR, D, ΔD, G2, α and K by travel domain X mentioned above, G1 of the own vehicle acceleration/deceleration G1 is taken as a target variable and the other travel data V1, θ, V2, VR, D, ΔD, G2, α and K are taken as explanatory variables. By calculating the multiple regression coefficients a1 to a10 by travel domain X, preference data are generated to express preferences of the driver during vehicle travel.

$$G1 = a1 \times V1 + a2 \times \theta + a3 \times V2 + a4 \times VR +$$
$$a5 \times D + a6 \times \Delta D + a7 \times G2 + a8 \times \alpha + a9 \times K + a10 \quad (3)$$

Then, in this embodiment, the multiple regression coefficients a1 to a10, which are preference data by travel domain X, are calculated. Here, if travel data have small values of the single coefficients of correlation r with the own vehicle acceleration/deceleration G1 and are utilised as explanatory variables, generated preference data do not reflect the preferences of the driver correctly. The data selection part 36 therefore selects, by travel domain X, travel data of which the absolute value of the single coefficient of correlation r with the own vehicle acceleration/deceleration G1 is above a predetermined value. The multiple regression coefficient calculating part 38 calculates multiple regression coefficients corresponding to these explanatory variables, by travel domain X, in accordance with a multiple regression model using only the selected travel data as explanatory variables.

For example, it is assumed that only the relative vehicle speed VR and the inter-vehicle distance deviation ΔD among travel data sampled in a certain travel domain X have the absolute value of the single coefficients of correlation r with the own vehicle acceleration/deceleration G1 above the predetermined value between digitization operation being permitted by the sampling suspension determining part 26 and next prohibited. Under this assumption, the multiple regression coefficient calculating part 38 uses the three pieces of sampling data that are the own vehicle acceleration/deceleration G1, the relative vehicle speed VR and the inter-vehicle distance deviation ΔD. The multiple regression coefficients a4 and a10 are calculated in accordance with the multiple regression model of the following expression (4), while the multiple regression coefficients a1 to a3, a5, and a7 to a9 are taken as '0'.

$$G1 = a4 \times VR + a6 \times \Delta D + a10 \quad (4)$$

After the multiple regression coefficient calculating part 38 calculates the multiple regression coefficients a1 to a10 as described above, it averages the computed ones with the ones stored as target acceleration/deceleration computation data in the control data storing part 12. It then takes these averaged multiple regression coefficients a1 to a10 as preference data expressing preferences of the driver in the corresponding travel domain X. It overwrites the target acceleration/deceleration computation data a1 to a10 in the control data storing part 12 with the averaged multiple regression coefficients a1 to a10.

And then, in the control data computation part 30, a single regression coefficient calculating part 39, for updating the target inter-vehicle distance computation data b1, b2 stored in the control data storing part 12, is also provided.

The single regression coefficient calculating part 39 takes in by travel domain X the inter-vehicle distance D and the own vehicle speed V1 among the travel data sampled by the sampling part 32 by travel domain X between digitization operation being permitted by the sampling suspension determining part 26 and next prohibited. It calculates single regression coefficients b1, b2 by travel domain X in accordance with the single regression model of the following expression (5), wherein the inter-vehicle distance D is taken as a target variable and the own vehicle speed V1 as an explanatory variable.

$$D = b1 \times V1 + b2 \quad (5)$$

Then, when the single regression coefficient calculating part 39 has calculated the target single regression coefficients b1, b2 by travel domain X, it averages by travel domain X the single regression coefficients b1, b2 computed this time with ones stored in the control data storing part 12 as target inter-vehicle distance computation data. It takes these averaged single regression coefficients b1, b2 as preference data expressing preferences of the driver in the corresponding travel domain X. It overwrites the target inter-vehicle distance computation data b1, b2 in the control data storing part 12 with the averaged ones.

In this way, the control data stored in the control data storing part 12 (target inter-vehicle distance computation data, target acceleration/deceleration computation data, etc.), by the operation of the control data computation part 30, are updated to data corresponding with preferences of the driver. However, in some cases the updated control data may not reflect correctly the preferences of the driver. In this embodiment, the control data stored in the control data storing part 12 can be therefore initialized by a control data initialization part 28.

When the ACC carried out by the ACC ECU 10 has been stopped, the control data initialization part 28 determines on the basis of an accelerator operation amount and a brake operation amount of the driver whether that control stoppage is caused by a brake operation or an accelerator operation of the driver or by a switch operation of the driver. The stoppage caused by a brake operation or an accelerator operation of the driver can be regarded as an operation resulting from the preferences of the driver not being correctly reflected. The stoppage caused by a switch operation of the driver can be regarded as a manifestation of the will of a driver wanting to drive with his own operations. It then determines whether the control data stored in the control data storing part 12 is suitable, and when determining that the control data is not suitable, initializes the control data stored in the control data storing part 12.

As described above, in the ACC ECU 10, using travel data of various kinds acquired during vehicle travel based on driving operations of the driver, updates control data (target inter-vehicle distance computation data and target acceleration/deceleration computation data) for computing the target acceleration/deceleration G0, which is a control target, at the time of ACC execution. Thereby the behavior of the vehicle at the time of ACC execution is made to approach the individual preferences of the driver. Next, control processing executed by the microcomputer constituting of the ACC ECU 10 to realize the functions shown in FIG. 2 will be described following the flow charts shown in FIG. 4 and FIG. 5.

Figure 4:
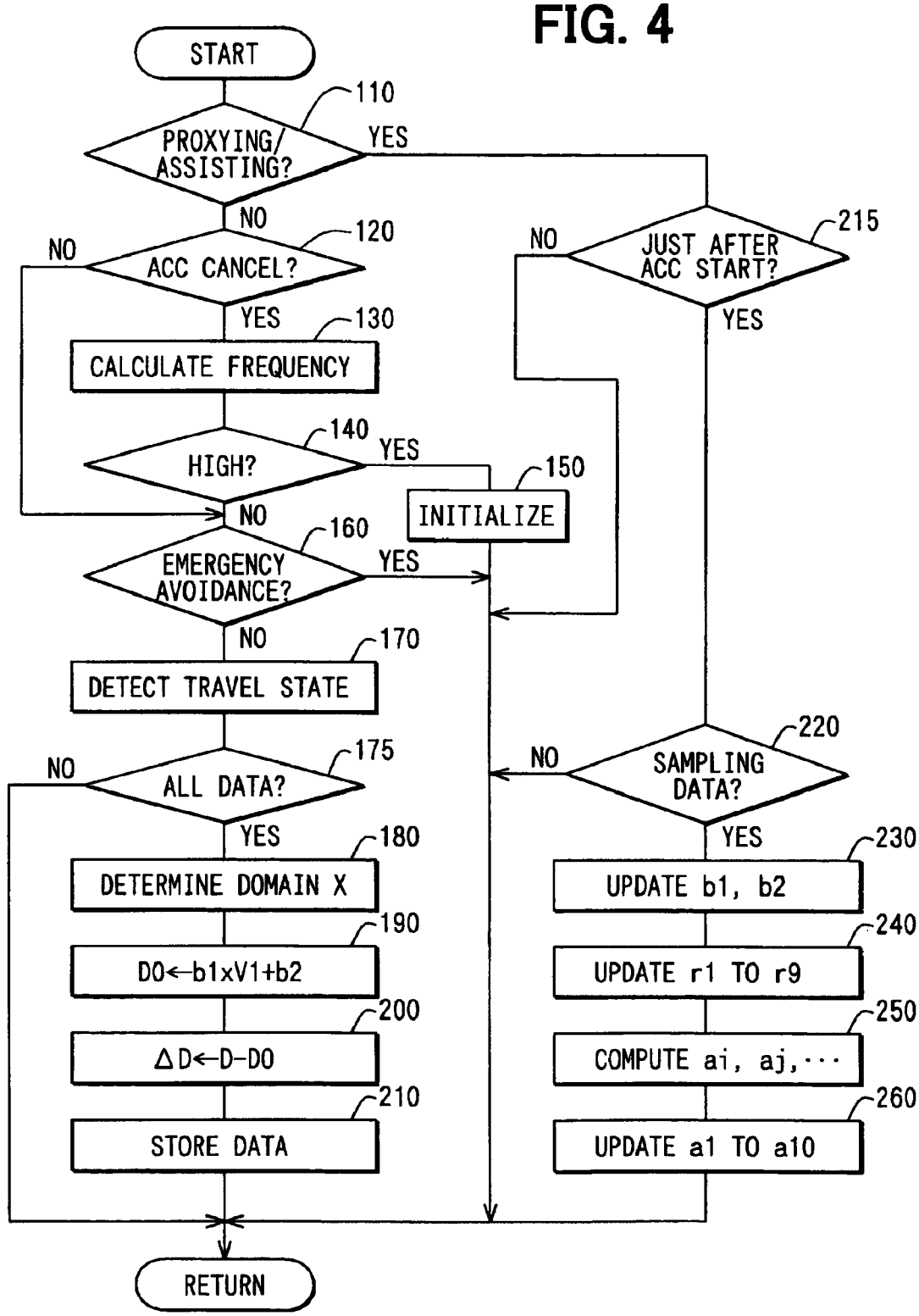
FIG. 4 is a flow chart showing control data computation processing of the first embodiment.

First, FIG. 4 is a flow chart mainly showing control data computation processing to realize a function constituting the control data computation part 30 described above.

First in S110 (S means step), processing to constitute the sampling suspension determining part 26, which determines whether a proxying/assisting apparatus including the ACC ECU 10 is operating, is executed. If no proxying/assisting apparatus is operating, processing proceeds to S120.

Next, in S120, the ACC carried out by this ACC ECU 10 has been executed hitherto. And it is determined whether the ACC has been temporarily canceled by the driver performing an ACC-canceling operation such as a brake operation or an accelerator operation. If the ACC has just been canceled by the ACC-canceling operation, in S130 the number of times of that an ACC-canceling operation has been carried out during the ACC execution is calculated from a history of past ACC-canceling operations. In S140 it is determined whether this operation frequency is higher than a predetermined upper limit value.

When in S140 it is determined that the operation frequency is higher, the target inter-vehicle distance computation data and the target acceleration/deceleration computation data stored in the control data storing part 12 are deemed to not reflect the preferences of the driver correctly. Processing moves to S150, processing to constitute the control data initialization part 28. Here, processing sets all the control data stored in the control data storing part 12 (the target inter-vehicle distance computation data, the target acceleration/deceleration computation data, the single correlation coefficients) to initial values and the present processing then ends.

On the other hand, when in S140 it is determined that the operation frequency is below the upper limit value, or it is determined in S120 that the ACC-cancelling operation has not been carried out, in S160 it is determined whether the driver is currently performing a vehicle manoeuver for emergency avoidance. Specifically, processing to constitute the sampling suspension determining part 26 is executed, which determines from changes in the steering angle θ, the own vehicle speed V1 and the own vehicle acceleration/deceleration G1 and so on whether the driver performed a driving operation such as a sudden steer or a sudden brake to avoid an accident.

Then, when in S160 it is determined that the emergency avoidance operation has been carried out by the driver, processing ends directly. When conversely it is determined that the emergency avoidance operation by the driver has not been carried out, processing proceeds to the following S170.

Next, in S170, vehicle travel state detection processing is executed, which acquires the travel data G1, V1, θ, V2, VR, D, G2, α and K from the radar device 10a or the other ECUs.

Then, in the following S175, it is determined whether all the travel data G1, V1, θ, V2, VR, D, G2, α and K have been acquired by the detection processing of S170. If all of the travel data have not been acquired, processing ends directly, and conversely if all of the travel data have been acquired, processing proceeds to S180.

In S180, processing determines to which of the eight travel domains (domains 1 to 4, 1'–4') the present travel domain X of the vehicle belongs in accordance with the conditions shown in FIGS. 3A and 3B. Here it uses the vehicle in front acceleration/deceleration G2, the own vehicle speed V1 and the road gradient α from among the travel data acquired by the processing of S170. It constitutes the vehicle travel domain determination part 18.

And, in the following S190, processing to constitute the target inter-vehicle distance computation part 20 is executed. It takes in the target inter-vehicle distance computation data b1, b2 corresponding to the travel domain X determined by S180 from memory (backup RAM or the like) constituting the control data storing part 12. Using these data b1, b2 and the own vehicle speed V1 acquired by the detection processing of S170, in accordance with the above expression (1), a target inter-vehicle distance D0 is computed.

Then, in the following S200, using the inter-vehicle distance D acquired by the detection processing of S170 and the target inter-vehicle distance D0 computed in S190, processing computes the inter-vehicle distance deviation ΔD (=D−D0). It constitutes the inter-vehicle distance deviation computation part 24. In the following S210, processing stores in memory as sampling data corresponding to the travel domain X determined in S180 all the travel data G1, V1, θ, V2, VR, D, G2, α and K acquired by the detection processing of S170 and the inter-vehicle distance deviation ΔD computed in S200. And the present processing ends. This processing constitutes the sampling part 32 is executed On the other hand, when in S110 it is determined that a proxying/assisting apparatus including the ACC ECU 10 is operating, processing proceeds to S215 and determines whether at present the ACC ECU 10 has just started ACC (immediately after ACC operation start). When it is not immediately after the ACC operation start, the present processing ends directly. When conversely it is immediately after the ACC operation start, processing proceeds to S220 and determines whether a predetermined number of sampling data sampled by the processing described above (the travel data G1, V1, θ, V2, VR, D, ΔD, G2, α and K) are stored in memory.

Then, if there is not the predetermined number of the sampling data in memory, the present processing ends directly. If there are the predetermined number of sampling data in the memory, on the basis of these sampling data, to update the control data in the control data storing part 12, the processing of S230 to S260 is executed.

That is, first, in S230, processing to constitute the single regression coefficient calculating part 39 is executed. Processing, by travel domain X, reads out the sampling data of the own vehicle speed V1 and the inter-vehicle distance D from the memory. Processing computes single regression coefficients b1, b2 in accordance with the single regression model of the above expression (5). Processing then updates the target inter-vehicle distance computation data stored in the memory constituting the control data storing part 12.

And, in S240, processing to constitute the correlation coefficient calculating part 34 is executed. Processing, by travel domain X, reads out from the memory the sampling data of all the travel data G1, V1, θ, V2, VR, D, ΔD, G2, α and K. Processing computes single coefficients of correlation r1 to r9 of, from among these read-out sampling data, the own vehicle acceleration/deceleration G1 used as a target variable in the multiple regression analysis with the other travel data V1, θ, V2, VR, D, ΔD, G2, α and K used as explanatory variables. Processing then updates the single correlation coefficients stored in the memory constituting the control data storing part 12.

Next, in S250, multiple regression coefficients ai, aj, . . . are computed by multiple regression analysis. Here, the target variable is sampling data of own vehicle acceleration/deceleration G1 read out by travel domain X. Explanatory variables are sampling data of the other travel data corresponding to single correlation coefficients ri, rj . . . whose absolute value is above a predetermined value (for example 0.5) of the single correlation coefficients r1 to r9 updated by travel domain X in S240.

Then, in the following S260, using the multiple regression coefficients ai, aj, . . . computed by travel domain X in S250, the target acceleration/deceleration computation data a1 to a10 stored by travel domain X in the memory serving as the control data storing part 12 are updated. After all the sampling data in the memory are deleted, the present processing ends.

Here, target acceleration/deceleration computation data a1 to a10 whose single correlation coefficient r is small are updated (averaged) with the result of the multiple regression analysis being taken as '0'.

And, in this embodiment, the processing of the above S250 and S260 functions as the data selection part 36 and the multiple regression coefficient calculating part 38 described above.

Figure 5:
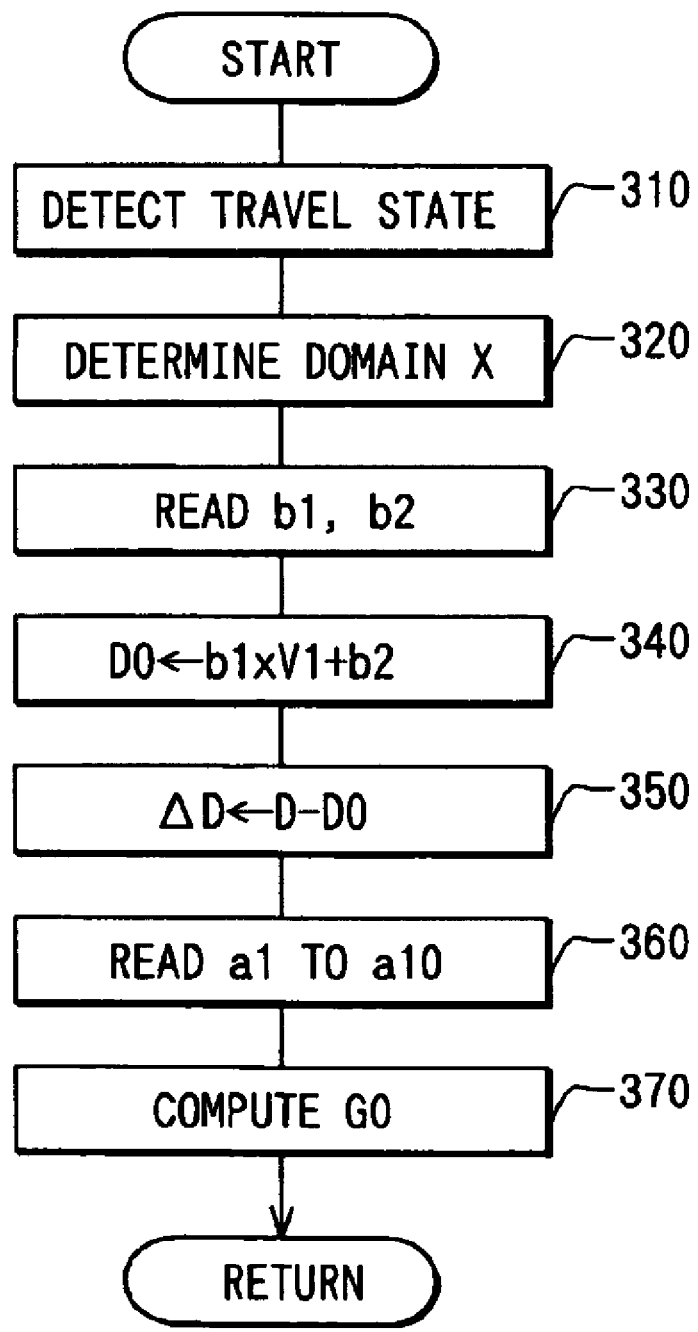
FIG. 5 is a flow chart showing target acceleration/deceleration computation processing of the first embodiment.

Next, FIG. 5 is a flow chart mainly showing target acceleration/deceleration computation data processing executed by the microcomputer constituting of the ACC ECU 10 to realize a function serving as the target acceleration/deceleration computation part 14 described above.

As shown in FIG. 5, in this processing, first in S310, vehicle travel state detection processing for acquiring the travel data V1, θ, V2, VR, D, G2, α and K from the radar device 10a and other ECUs is executed.

Then, in the following S320, processing to constitute the vehicle travel domain determination part 18 is executed. Here, of the travel data acquired by the detection processing of S310, the vehicle in front acceleration/deceleration G2, the own vehicle speed V1 and the road gradient α are used. Processing, in accordance with the conditions shown in FIG. 3A, determines to which of the eight travel domains (domains 1 to 4, 1' to 4') the present travel domain X of the vehicle belongs.

And, in the following S330, the target inter-vehicle distance computation data b1, b2 corresponding to the travel domain X determined in S320 are taken in from the memory serving as the control data storing part 12. In S340, using these data b1, b2 and the own vehicle speed V1 acquired by the detection processing of S310, processing to constitute the target inter-vehicle distance computation part 20 is executed. Processing computes a target inter-vehicle distance D0 in accordance with the above expression (1).

Next, in S350, using the inter-vehicle distance D acquired by the detection processing of S310 and the target inter-vehicle distance D0 computed in S340, processing to constitute the inter-vehicle distance deviation computation part 24 is executed. Processing computes the inter-vehicle distance deviation ΔD (=D−D0).

Then, in the following S360, the target acceleration/deceleration computation data a1 to a10 are read in from the memory serving as the control data storing part 12. In S370, processing to constitute the target acceleration/deceleration computation part 14 is executed. Here processing uses those read-in target acceleration/deceleration computation data a1 to a10 and all the travel data V1, θ, V2, VR, D, G2, α and K acquired by the detection processing of S310 and the inter-vehicle distance deviation ΔD computed in S350, in accordance with the above expression (2). Processing computes a target acceleration/deceleration G0, which is a control target of the ACC, and then the present processing ends.

The target acceleration/deceleration G0 computed in this target acceleration/deceleration computation processing is stored once in memory and used in control amount computation processing (not shown) to constitute the command value computation part 16. The control amount computation processing computes a throttle opening angle of the engine 2a, a speed change step of the automatic transmission 4a, and a brake pressure of the brake device 6a.

As described above, in this embodiment, in the setting of a vehicle target acceleration/deceleration G0, which is a control target for ACC, an own vehicle speed V1, a steering angle θ, a vehicle in front speed V2, a relative vehicle speed VR, an inter-vehicle distance D, a vehicle in front acceleration/deceleration G2, a road gradient α, a road curvature K and an inter-vehicle distance deviation ΔD are used. Furthermore, target acceleration/deceleration computation data a1 to a10 used to set the target acceleration/deceleration G0 from these travel data V1, θ, V2, VR, D, G2, α, K and ΔD are updated on the basis of multiple regression coefficients (preference data). Multiple regression coefficients are obtained by multiple regression analysis using travel data G1, V1, θ, V2, VR, D, ΔD, G2, α, K sampled when the vehicle is traveling under the driving control of the driver.

Consequently, with this embodiment, the behavior of the vehicle during ACC execution can be controlled to behavior preferred by the driver. It is possible to realize ACC better for the driver compared to related art apparatus wherein travel environment factors such as inter-vehicle distance are set on the basis of learning results learned by single regression analysis.

Figure 6:
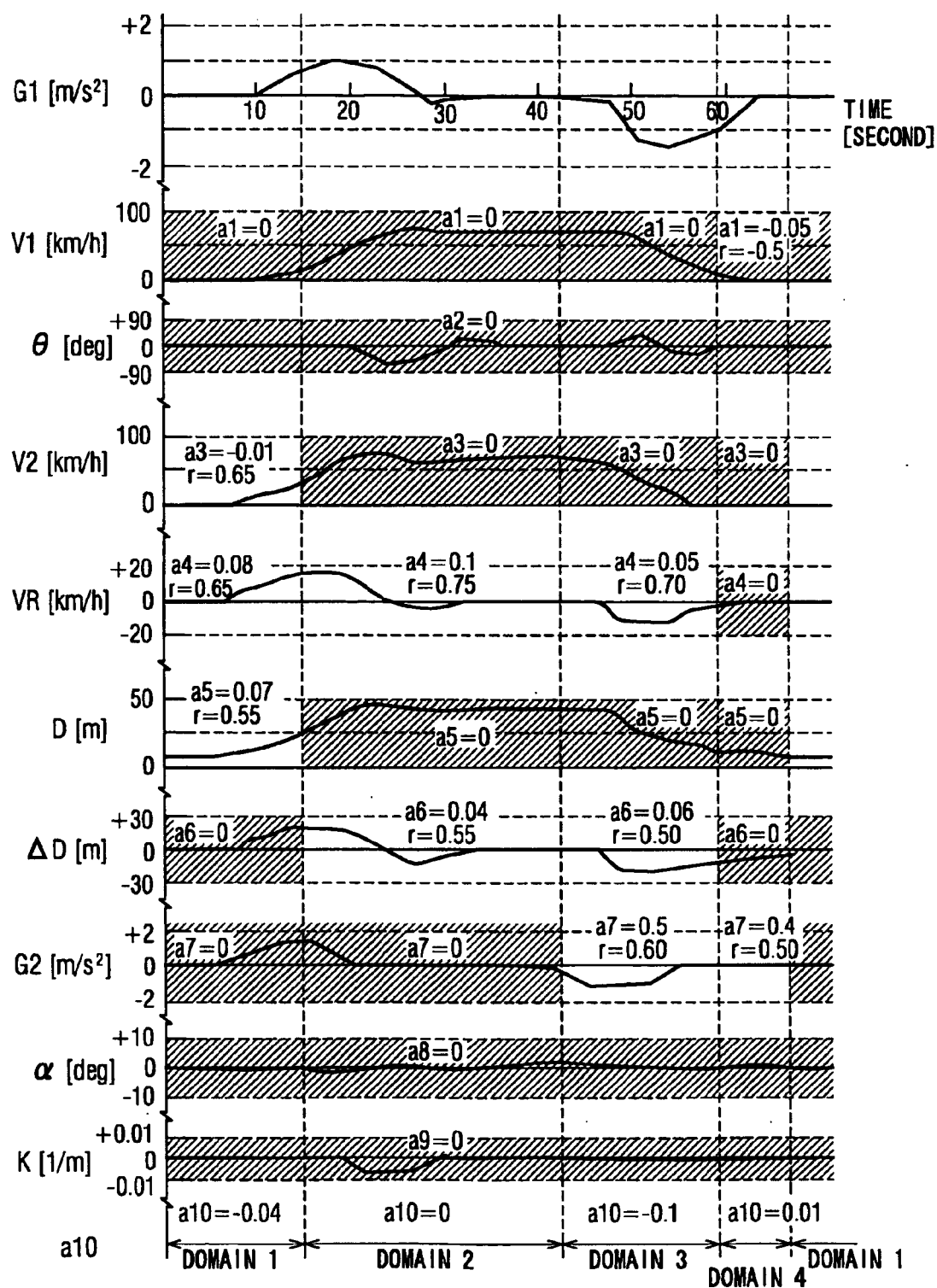
FIG. 6 is a time chart showing changes in preference data (multiple regression coefficients) computed in correspondence with travel data in the first embodiment.

And, in this embodiment, in the computing of the multiple regression coefficients a1 to a10, which are preference data based on multiple regression analysis, as shown by an example in FIG. 6, the travel domain X of the vehicle is divided into multiple domains (in FIG. 6, domains 1 to 4) and travel data is sampled by travel domain X. Furthermore, of this sampled travel data, single coefficients of correlation r of the own vehicle acceleration/deceleration G1, which is the target variable of the multiple regression analysis, with the other travel data are computed. Multiple regression coefficients corresponding to those travel data are computed by using travel data of which the absolute value of the single correlation coefficient r is above a predetermined value (for example 0.5) and the own vehicle acceleration/deceleration G1.

Consequently, with this embodiment, it is prevented from happening that no correlation can be found between the explanatory variables and the target variable used in computing the multiple regression coefficients in the multiple regression analysis. It is also prevented from happening that the multiple regression coefficients (in other words, the target acceleration/deceleration computation data a1 to a10), which are preference data of the driver, do not reflect the preferences of the driver. The target acceleration/deceleration G0 can be set using target acceleration/deceleration computation data a1 to a10 which reflect correctly the individual preferences of the driver.

FIG. 6 is a time chart showing in association, for when the vehicle is traveling on a substantially flat road or uphill road whose road gradient α is greater than −4[deg], change of the travel data, change of the travel domain X, and the single correlation coefficients and multiple regression coefficients. The areas of the travel data V1, θ, V2, VR, D, ΔD, G2, α and K where hatching has been applied show areas where the absolute value of the single coefficient of correlation with the own vehicle acceleration/deceleration G1 is less than a predetermined value (0.5) and the multiple regression coefficient is set to '0' at the time of the multiple regression analysis.

And, in FIG. 6, it is shown that, for example in domain 1, the sampling data of which the absolute value of the single coefficient of correlation r with the own vehicle acceleration/deceleration G1 is above the predetermined value (0.5) are the sampling data of the vehicle in front speed V2, the relative vehicle speed VR and the inter-vehicle distance D. The multiple regression coefficients computed for updating of the target acceleration/deceleration computation data a1 to a10 are a3, a4 and a5 corresponding to these travel data V2, Vr and D and the multiple regression coefficient a10, which is the constant term. The multiple regression coefficients a1, a2, a6 to a9 corresponding to the other travel data V1, θ, ΔD, G2, α and K are set to '0'. The target acceleration/deceleration computation data a1 to a10 in this domain 1 are updated by being averaged with the multiple regression coefficients a1 to a10 including the value 0 set by this kind of multiple regression analysis.

Figure 7:
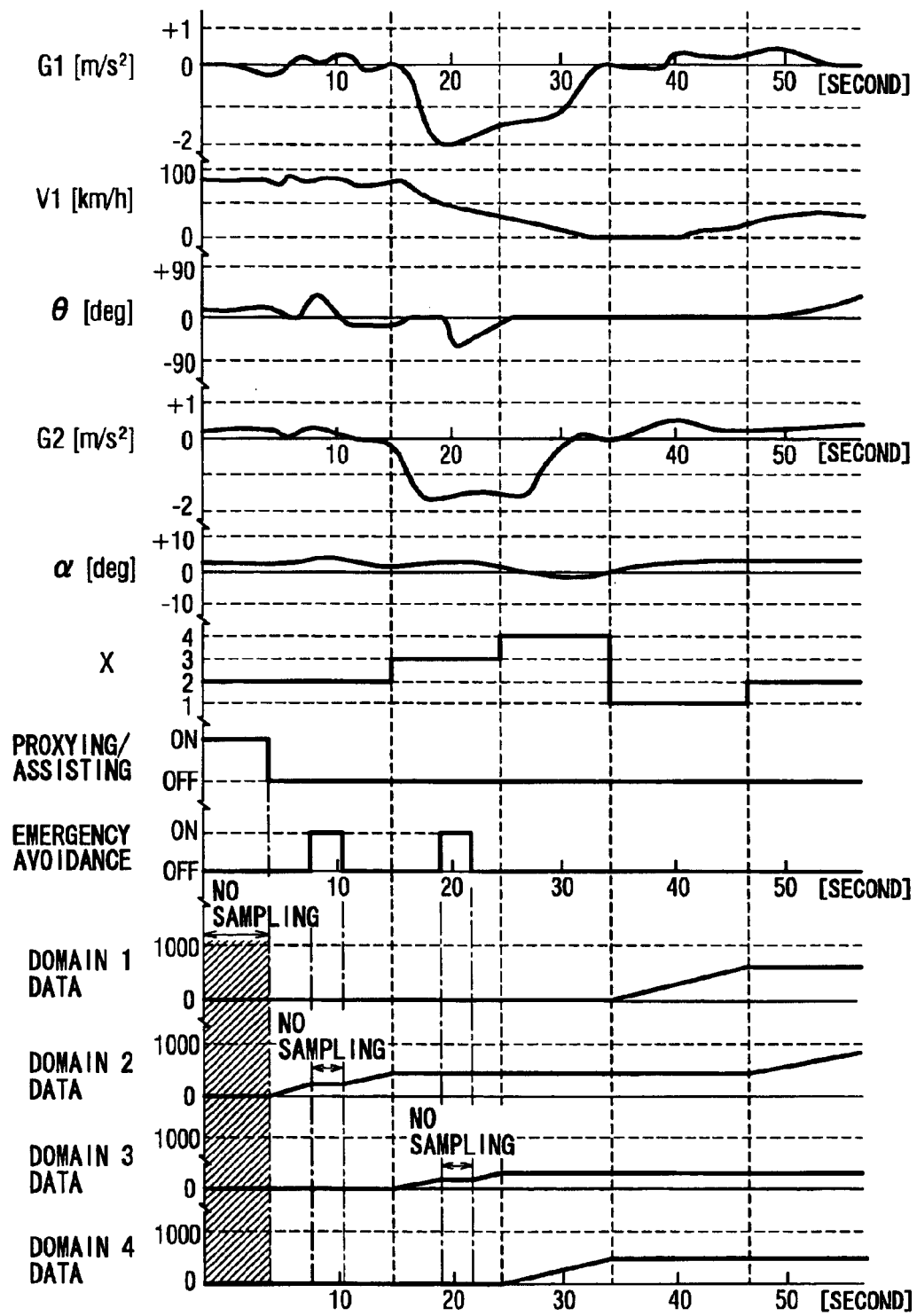
FIG. 7 is a time chart explaining travel data sampling stoppage periods in the first embodiment.

And next, FIG. 7 shows an example when a proxying/assisting apparatus including the ACC ECU 10 is operating, and/or when the driver has suddenly operated the steering wheel or the brakes to avoid danger such as a collision (emergency avoidance operation). Here, sampling of travel data used for calculating the multiple regression coefficients is stopped. Only when the vehicle is traveling stably under the control of the driver the sampling of travel data carried out.

Consequently, in this embodiment, when the vehicle is in a travel state unsuitable from the point of view of travel safety, the sampling of travel data is prohibited. The multiple regression coefficients a1 to a10 and the single regression coefficients b1, b2, which are preference data, are computed using travel data of when the driver is causing the vehicle to travel safely. Therefore, with this embodiment, during ACC execution, the vehicle can be made to travel safely using target acceleration/deceleration computation data a1 to a10 and target inter-vehicle distance computation data b1, b2 updated with these multiple regression coefficients a1 to a10 and single regression coefficients b1, b2.

Figure 8:
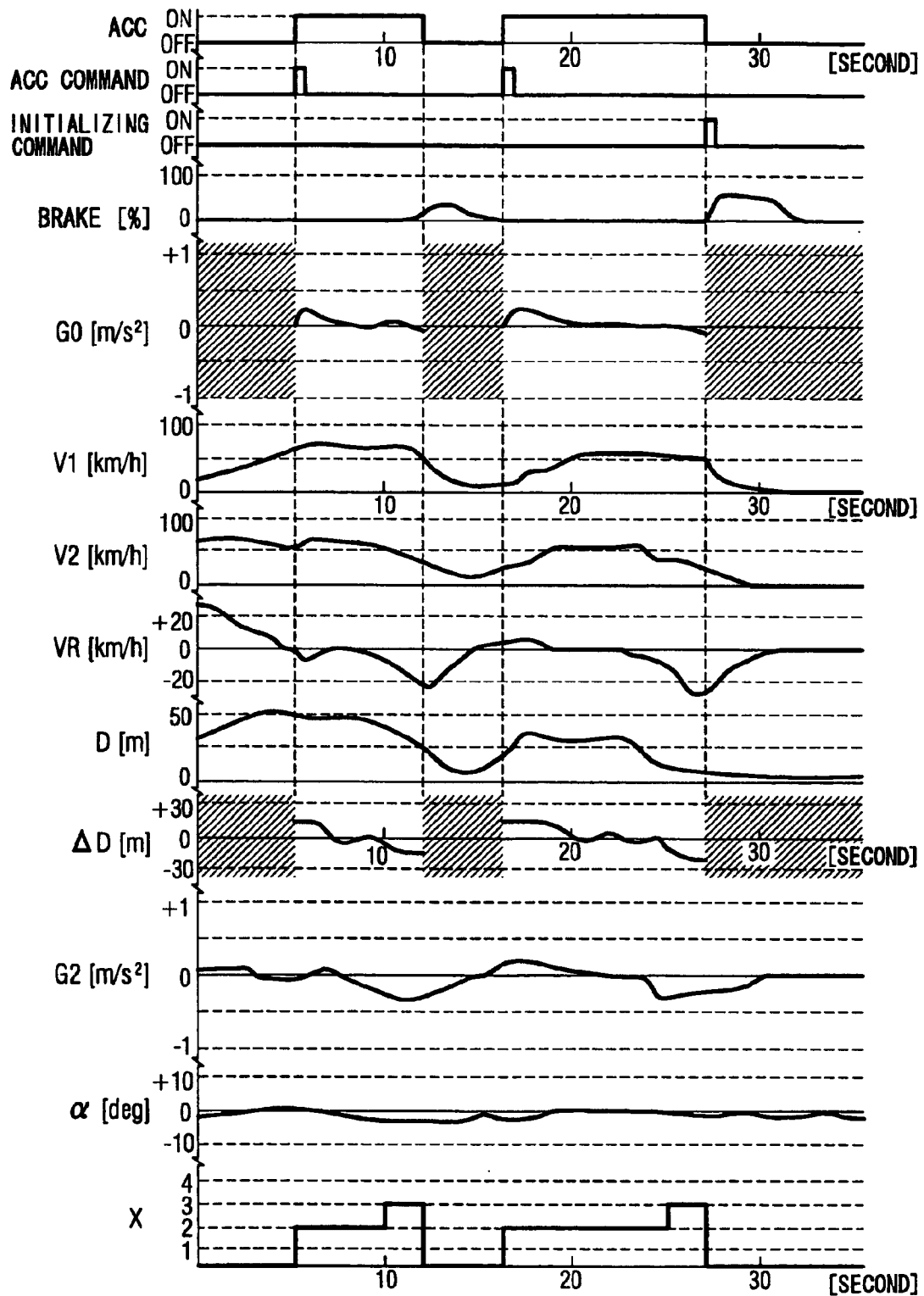
FIG. 8 is a time chart explaining a control data initialization operation in the first embodiment.

And also, in this embodiment, as an example is shown in FIG. 8, during ACC execution the frequency with which control is temporarily stopped by a driver brake operation or accelerator operation is high (FIG. 8 shows a case wherein ACC has been stopped twice by a driver brake operation in a short time shorter than 30 seconds). Under this condition, the target inter-vehicle distance computation data b1, b2 and the target acceleration/deceleration computation data a1 to a10 used for control are returned to initial values.

Here, in this embodiment, travel domains X are divided into eight travel domains (domains 1 to 4, 1' to 4') using the vehicle in front acceleration/deceleration G2 and the own vehicle speed V1 and the road gradient α. However, regarding the data and the partitioning method used in the partitioning of the travel domain X, they should be set suitably in accordance with the characteristics of the vehicle that is the control object and the type of the control.

Figure 9A:
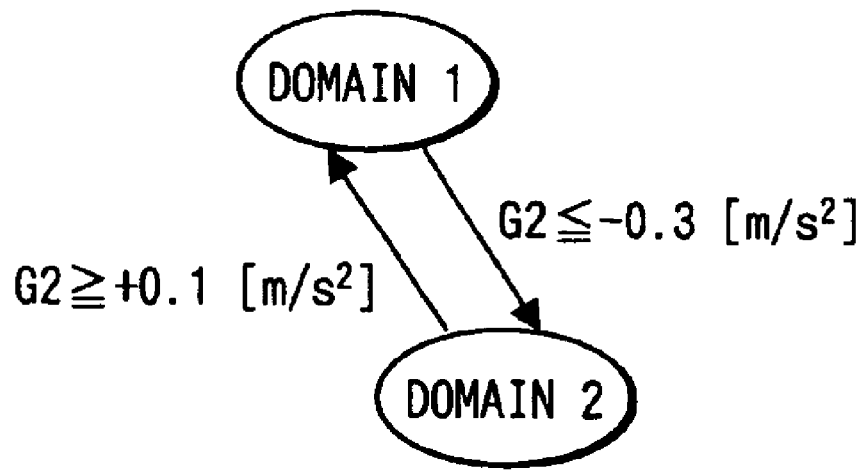
FIGS. 9A and 9B are explanatory diagrams explaining a travel domain division method suited to automatic following control.

When the kind of ACC of this embodiment is carried out, the preferences of the driver are greatly divided between the case of accelerating along with acceleration of the vehicle in front and the case of decelerating along with deceleration of the vehicle in front. Therefore, preferably, at least, as an example is shown in FIG. 9A, the travel domain X is partitioned using the vehicle in front (or own vehicle) acceleration/deceleration G2. Otherwise, as an example is shown in FIG. 9B, the travel domain X is partitioned using the relative acceleration of the vehicle in front with respect to the own vehicle.

FIG. 9A shows the travel domain X being set to either a travel domain 1 or a travel domain 2 in correspondence with the vehicle in front acceleration/deceleration G2. During sampling of travel data, as in when during vehicle travel there is a vehicle in front the travel domain 1 is set. When during travel in the travel domain 1 the vehicle in front starts to decelerate and the vehicle in front acceleration/deceleration G2 falls below $-0.3[m/s^2]$ a travel domain 2 is set. When the vehicle in front acceleration/deceleration G2 rises above $+0.1[m/s^2]$ the travel domain 1 is set.

Figure 9B:
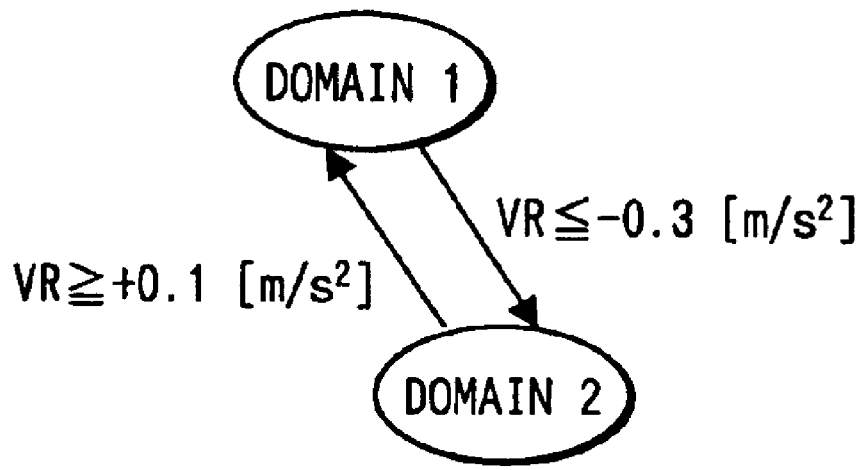

And, FIG. 9B shows the travel domain X being set to either a travel domain 1 or a travel domain 2 in correspondence with the relative acceleration of the vehicle in front with respect to the own vehicle. During sampling of travel data, as in when during vehicle travel there is a vehicle in front a travel domain 1 is set. When the relative acceleration of the vehicle in front with respect to the own vehicle falls below $-0.3[m/s^2]$ (i.e. when the own vehicle is moving closer to the vehicle in front) a travel domain 2 is set. When during travel in the travel domain 2 the relative acceleration of the vehicle in front and the own vehicle falls below $+0.1[m/s^2]$ the travel domain 1 is set.

[Second Embodiment]

Next, a second embodiment of the invention will be described, using FIG. 10 through FIG. 15.

This embodiment, like the travel control apparatus of the first embodiment, relates to an ACC apparatus for causing an own vehicle to automatically follow a vehicle in front, and the system structure of the overall apparatus is the same as the first embodiment shown in FIG. 1.

The two points differ from the first embodiment. The first point is that when the ACC ECU 10 computes the target acceleration/deceleration G0, which is a control target, it uses a map having relative vehicle speed VR of the own vehicle and the vehicle in front and inter-vehicle distance deviation ΔD as parameters. The second point is that this map is updated from a basic map shown in FIG. 11A to a driver preference map of the kind shown in FIG. 14A or FIG. 15A, using sampling data sampled during vehicle travel based on driving operations of the driver. The travel control apparatus of this embodiment will be described below, centering on the points differing from the first embodiment.

Figure 10:
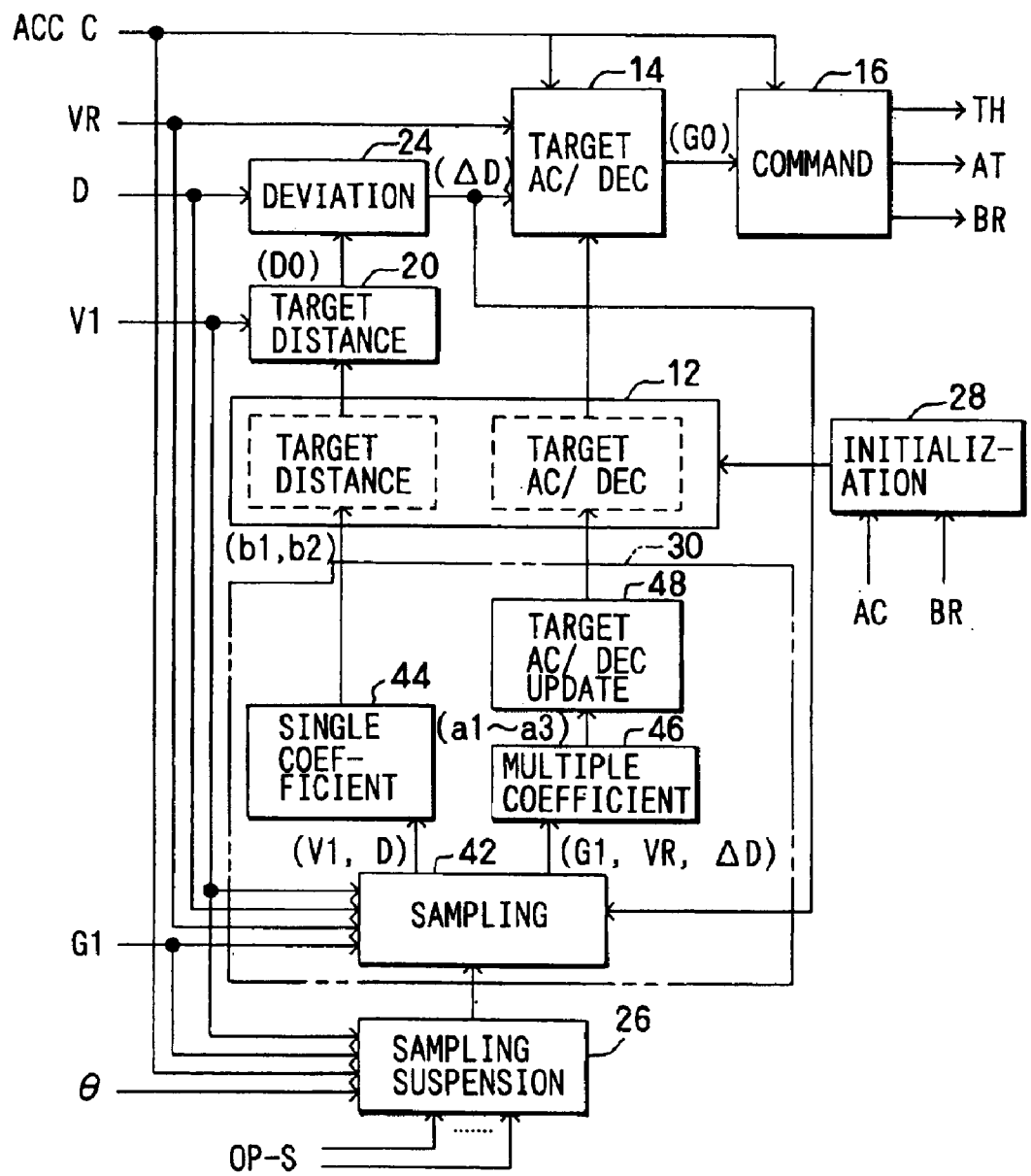
FIG. 10 is a function block diagram showing an ACC ECU of a second embodiment.

As shown in FIG. 10, the ACC ECU 10 of this embodiment has a control data storing part 12 in which are stored two kinds of data, the map for target acceleration/deceleration computation mentioned above and target inter-vehicle distance computation data b1, b2, as control data needed for executing ACC.

This control data storing part 12, like that of the first embodiment, in practice, is realized by means of memory of a microcomputer constituting the ACC ECU 10. Not only control data updated by operation of a control data computation part 30, but also pre-updating initial data of these are stored. The control data (the map for target acceleration/deceleration computation and target inter-vehicle distance computation data) to be updated, being discussed later, are actually used for control.

And, the basic map for computation of a target acceleration/deceleration G0, which is one of these initial data, is made in accordance with the following expression (6) having the relative vehicle speed VR and the inter-vehicle distance deviation ΔD as parameters.

$$G0 = a1 \times VR + a2 \times \Delta D + a0 \qquad (6),$$

In this embodiment a1 is set to 0.1, a2 to 0.04 and a0 to 0 so that '$G0=0.1\times VR+0.04\times \Delta D$'. Consequently, with this basic map, as shown in FIG. 11B and 11C, the target acceleration/deceleration G0 changes proportionally with the relative vehicle speed VR and the inter-vehicle distance deviation ΔD.

Next, the map for target acceleration/deceleration computation operates when an ACC execution command has been inputted from the driver, being inputted to the target acceleration/deceleration computation part 14. The target inter-vehicle distance computation data b1, b2 are inputted to the target inter-vehicle distance computation part 20.

Then, using the relative vehicle speed VR detected by the radar device 10a and the inter-vehicle distance deviation ΔD computed by the inter-vehicle distance deviation computation part 24, the target acceleration/deceleration computation part 14 computes a target acceleration/deceleration G0 in accordance with the map for target acceleration/deceleration computation. The target inter-vehicle distance computation part 20 computes a target inter-vehicle distance D0 in accordance with the above expression (1) using the own vehicle speed V1, which is travel data acquired from another ECU.

The inter-vehicle distance deviation computation part 24, like that of the first embodiment, computes the deviation (D–D0) between the target inter-vehicle distance D0 computed by the target inter-vehicle distance computation part 20 and the inter-vehicle distance D detected by the radar device 10a.

And, the target acceleration/deceleration G0 computed by the target acceleration/deceleration computation part 14, as in the first embodiment, is inputted to the command value computation part 16. In accordance with a preset procedure the command value computation part 16 sets a throttle angle, an AT speed change step and a brake pressure necessary for controlling the own vehicle acceleration/deceleration G1 to the target acceleration/deceleration G0, and transmits these to the engine ECU 2, the AT ECU 4 and the brake ECU 6.

On the other hand, the control data computation part 30 is made up of a sampling part 42, a single regression coefficient calculating part 44, a multiple regression coefficient calculating part 46, and a target acceleration/deceleration computation map updating part 48. It operates in accordance with a determination result of a sampling suspension determining part 26 like that of the first embodiment.

Here, the sampling part 42, during vehicle travel based on driving operations of the driver, samples repeatedly with a predetermined period the relative vehicle speed VR, the inter-vehicle distance D, the own vehicle speed V1, the own vehicle acceleration/deceleration G1 and the inter-vehicle distance deviation ΔD. The single regression coefficient calculating part 44 calculates single regression coefficients b1, b2 in accordance with a single regression model (see expression (5) above) having the own vehicle speed V1 as an explanatory variable and the inter-vehicle distance D as a target variable among the various travel data sampled by the sampling part 42.

The single regression coefficient calculating part 44, when it has computed the single correlation coefficients b1, b2, like the single regression coefficient calculating part 39 in the first embodiment, averages those computed single correlation coefficients b1, b2 with the single correlation coefficients b1, b2 stored in the control data storing part 12 as target inter-vehicle distance computation data. Taking those averaged single correlation coefficients b1, b2 as second preference data expressing preferences of the driver, it overwrites the target inter-vehicle distance computation data b1, b2 in the control data storing part 12 with the averaged single correlation coefficients b1, b2.

On the other hand, the multiple regression coefficient calculating part 46 calculates multiple regression coefficients a0 to a2 in accordance with the multiple regression model of the following expression (7), having the own vehicle acceleration/deceleration G1 as a target variable and the relative vehicle speed VR and the inter-vehicle distance deviation ΔD as explanatory variables, among the travel data sampled by the sampling part 32. It thereby generates preference data expressing the preferences of the driver during vehicle travel.

$$G1 = a1 \times VR + a2 \times \Delta D + a0 \qquad (7)$$

Then, the target acceleration/deceleration computation map updating part 48, using the multiple regression coefficients a0 to a2 computed by the multiple regression coefficient calculating part 46, updates the target acceleration/deceleration computation map in the control data storing part 12.

And, it may conceivably happen that due to a malfunction of the control data computation part 30 the control data do not correctly reflect the preferences of the driver. Therefore, in this embodiment also, by the operation of a control data initialization part 28 like that of the first embodiment above, it is determined whether the control data stored in the control data storing part 12 is suitable. When the control data is not suitable, the control data stored in the control data storing part 12 is initialized.

As described above, in this embodiment, in the ACC ECU 10, using various travel data acquired during vehicle travel based on driving operations of the driver, by updating a target acceleration/deceleration computation map and target inter-vehicle distance computation data, the behavior of the vehicle during ACC execution is made to approach the individual preferences of the driver. Next, control processing executed by the microcomputer to realize the functions shown in FIG. 10 will be described alongside the flow charts shown in FIG. 12 and FIG. 13.

Figure 12:
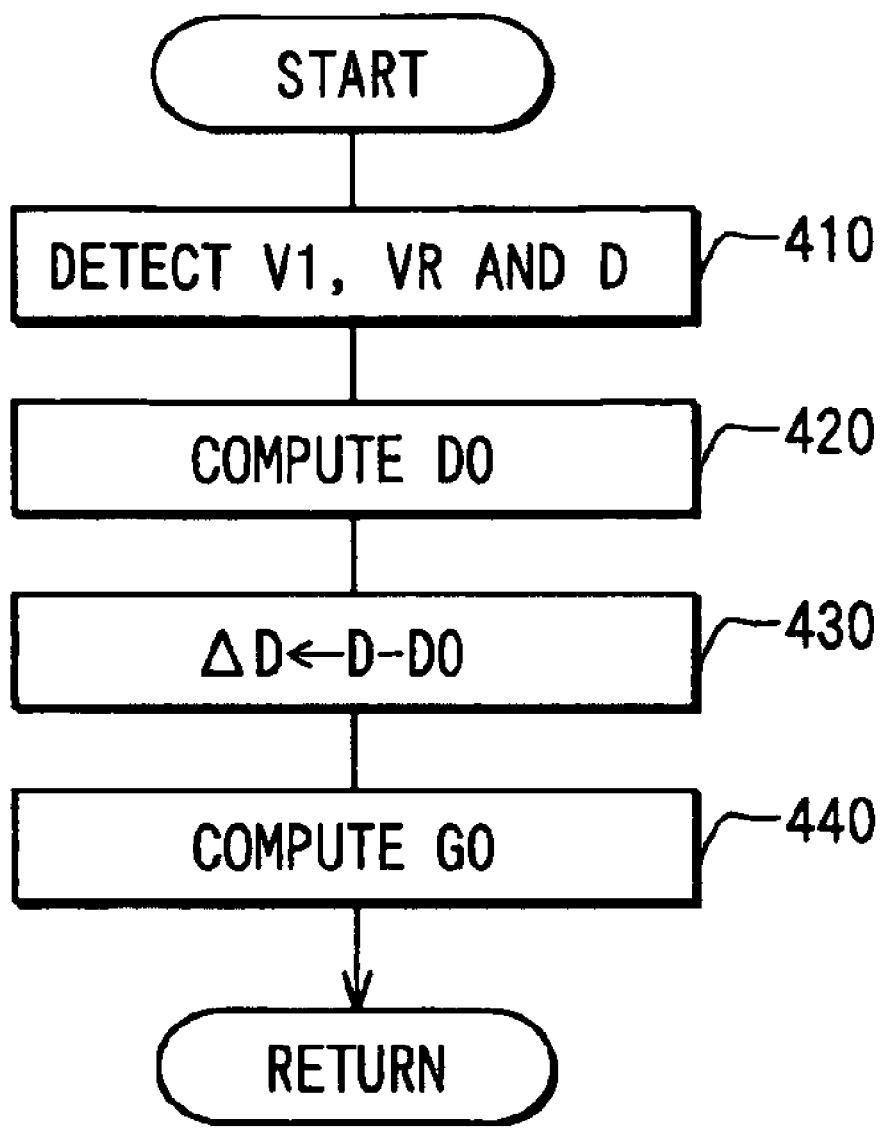
FIG. 12 is a flow chart showing target acceleration/deceleration computation processing of the second embodiment.

As shown in FIG. 12, in this processing, first in S410, vehicle travel state detection processing is carried out, which acquires the own vehicle speed V1, the relative vehicle speed VR and the inter-vehicle distance D from the radar device 10a and other ECUs. Then, in the following S420, using the own vehicle speed V1 acquired in S410 and the target inter-vehicle distance computation data b1, b2 stored in memory serving as the control data storing part 12, processing to constitute the target inter-vehicle distance computation part 20 is executed. It computes a target inter-vehicle distance D0 in accordance with the above expression (1).

And, in the following S430, using the inter-vehicle distance D acquired in the detection processing of S410 and the target inter-vehicle distance D0 computed in S420, processing to constitute the inter-vehicle distance deviation computation part 24 is executed, which computes the inter-vehicle distance deviation ΔD (=D−D0). Then, in the following S440, using the relative vehicle speed VR acquired in S410 and the inter-vehicle distance deviation ΔD computed in S430, processing to constitute the target acceleration/deceleration computation part 14 is executed. It computes a target acceleration/deceleration G0 in accordance with the target acceleration/deceleration computation map stored in the memory serving as the control data storing part 12, and the present processing then ends.

Figure 13:
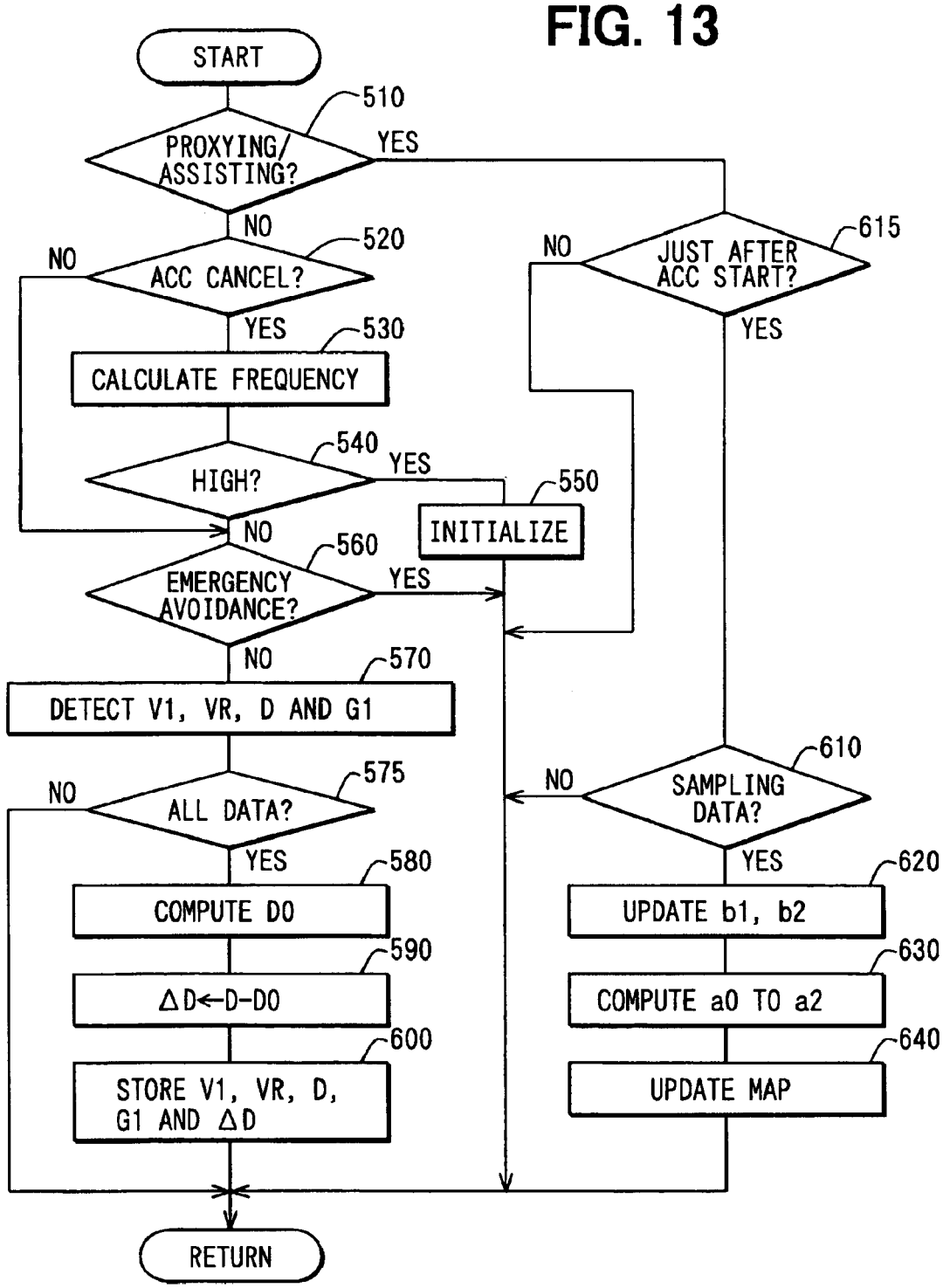
FIG. 13 is a flow chart showing control data computation processing of the second embodiment.

Next, FIG. 13 is a flow chart showing control data computation processing executed to update the target acceleration/deceleration computation map and the target inter-vehicle distance computation data to driver-preferred values.

As shown in FIG. 13, when this processing is started, the processing of S510 to S560 is executed in the same procedure as S110 to S160 of the first embodiment. In the series of processing of this S510 to S560, the proxying/assisting apparatus including the ACC ECU 10 has stopped control. When the frequency of ACC-canceling operations made by the driver is below an upper level limit, and furthermore an emergency avoidance operation by the driver has not been carried out, processing moves to S570. Here, processing executes vehicle travel state detection processing which acquires the own vehicle speed V1, the relative vehicle speed VR, the inter-vehicle distance D and the own vehicle acceleration/deceleration G1 from the radar device 10a or the other ECUs.

Then, in the following S575, by the detection processing of S570, it is determined whether the travel data V1, VR, D and G1 have been acquired, and if they have not been acquired then the present processing ends directly.

And, conversely, when the travel data V1, VR, D and G1 have been acquired, in the same procedure as the above-mentioned S420 and S430, a target inter-vehicle distance D0 is computed using the own vehicle speed V1 and the target inter-vehicle distance computation data b1, b2 (S580). And, the inter-vehicle distance deviation ΔD (=D−D0) is computed (S590).

Then, finally, in S600, processing constitutes the sampling part 42. It stores in memory the own vehicle speed V1, the relative vehicle speed VR, the inter-vehicle distance D and the own vehicle acceleration/deceleration G1 acquired in S570 and the inter-vehicle distance deviation ΔD computed in S590, and the present processing ends.

On the other hand, when in S510 it is determined that the proxying/assisting apparatus including the ACC ECU 10 is operating, processing proceeds to S615. It determines whether at present the ACC ECU 10 has just started ACC (immediately after ACC operation start). Then, if at present it is not immediately after the ACC operation start, the present processing ends directly. Conversely if it is immediately after the ACC operation start, processing proceeds to S610 and determines whether sampling data has been stored in memory. Then, if sampling data has not been stored in memory, the present processing ends directly. If sampling data has been stored in memory, processing proceeds to S620 and executes processing to constitute the single regression coefficient calculating part 39. It reads out the sampling data of the own vehicle speed V1 and the inter-vehicle distance D from the memory. It then computes single correlation coefficients b1, b2 in accordance with the single regression model of the above expression (5) and updates the target inter-vehicle distance computation data.

And, in the following S630, processing to constitute the multiple regression coefficient calculating part 46 is executed. It reads out all the sampling data of the own vehicle acceleration/deceleration G1, the relative vehicle speed VR and the inter-vehicle distance deviation ΔD from the memory. In accordance with the multiple regression model of the above expression (7), it generates preference data expressing preferences of the driver by calculating multiple regression coefficients a0 to a2. Then, in S640, using the multiple regression coefficients a0 to a2 computed in S630, processing to constitute the target acceleration/deceleration computation map updating part 48 is executed. It updates the target acceleration/deceleration computation map, and the present processing ends.

As described above, in this embodiment, in setting a target acceleration/deceleration G0 of the vehicle, which is a control target for ACC, a map having the relative vehicle speed VR and the inter-vehicle distance deviation ΔD as parameters is used. This map is updated by means of multiple regression coefficients (preference data) obtained by multiple regression analysis using an own vehicle acceleration/deceleration G1, a relative vehicle speed VR and an inter-vehicle distance deviation ΔD sampled when the vehicle is travelling under the driving control of the driver.

Figure 11A:
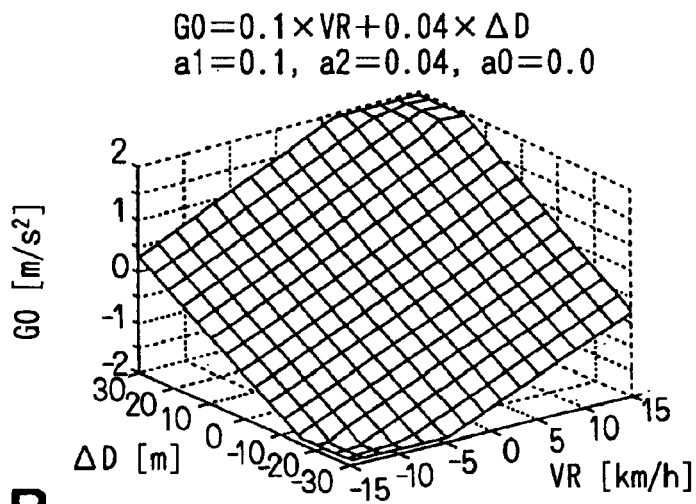
FIGS. 11A, 11B and 11C are explanatory diagrams showing a basic map for target acceleration/deceleration computation of the second embodiment.
Figure 11B:
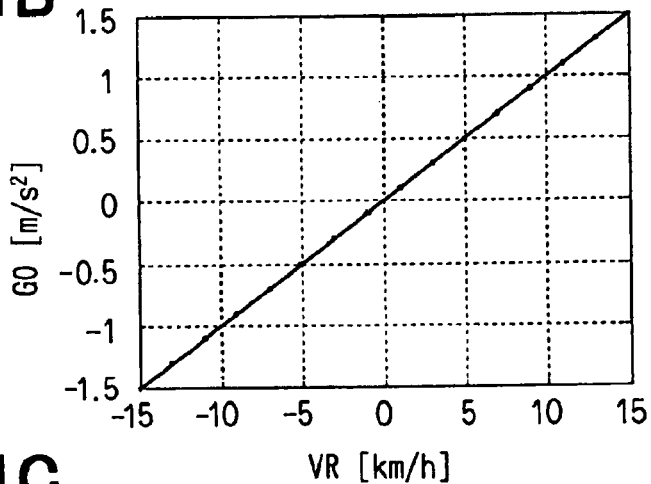
Figure 11C:
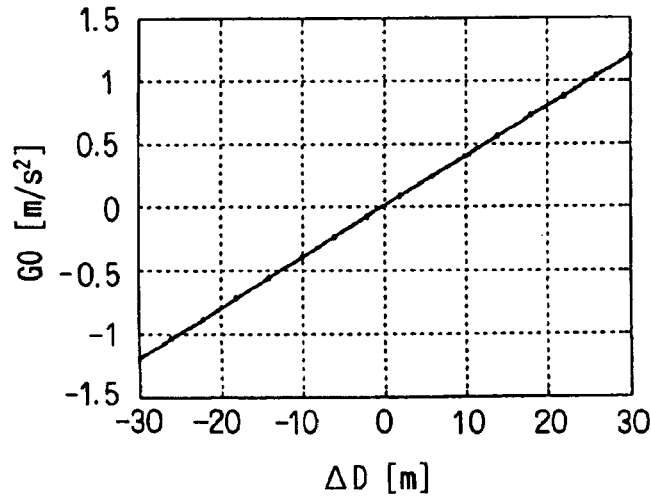
Figure 14A:
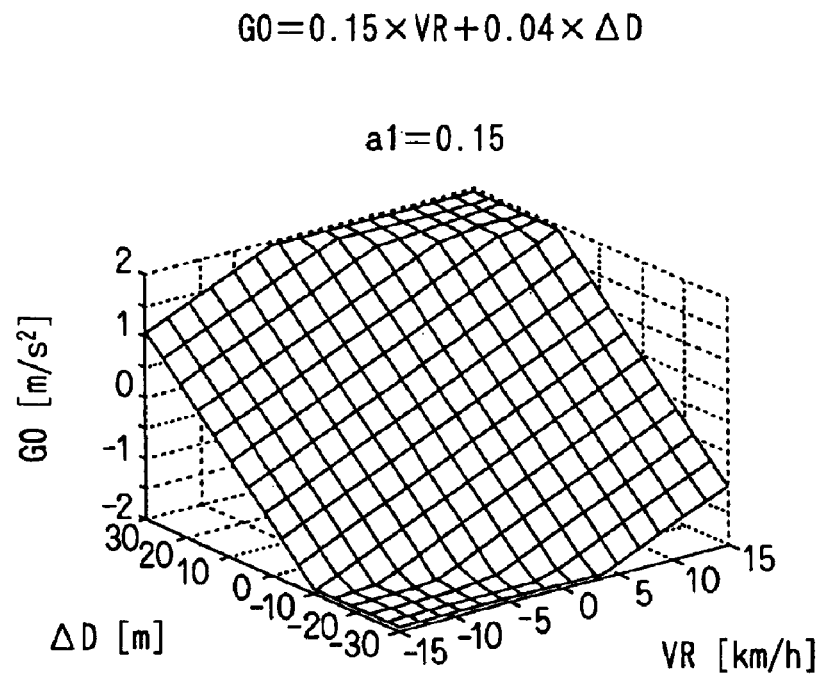
FIGS. 14A and 14B are explanatory diagrams showing a driver A preference map updated in the second embodiment.
Figure 14B:
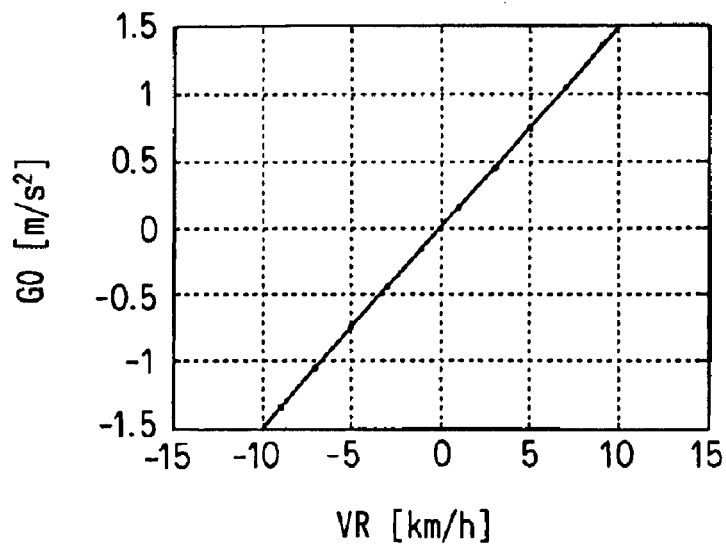
Figure 15A:
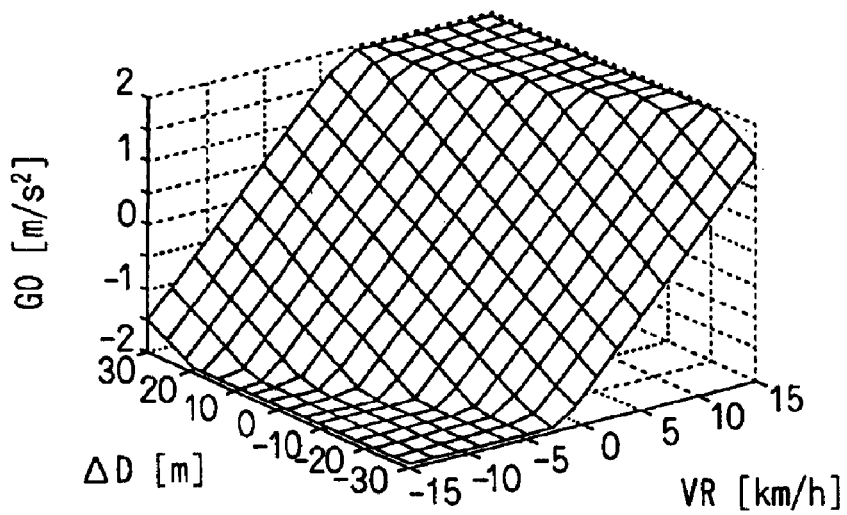
FIGS. 15A and 15B are explanatory diagrams showing a driver B preference map updated in the second embodiment.
Figure 15B:
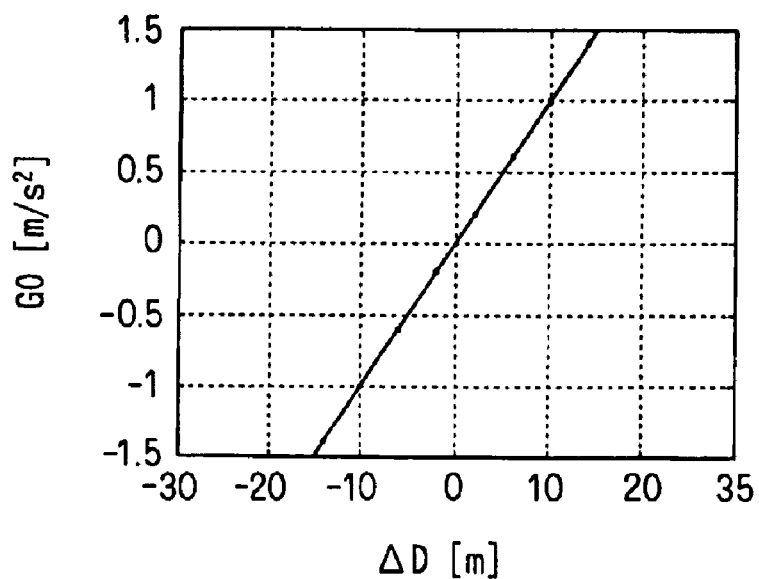

Consequently, with this embodiment, as the driver drives the vehicle, the target acceleration/deceleration computation map is updated from the basic map shown in FIG. 11A to a map of driver preferences shown in FIG. 14A or FIG. 15A. As in the first embodiment, the behavior of the vehicle during the ACC execution can be controlled to driver-preferred behavior.

FIG. 14A shows a map of preferences of a driver A, and is updated so that 'G0=0.15×VR+0.04×ΔD'. And FIG. 15A shows a map of preferences of a driver B, and is updated so that 'G0=0.1×VR+0.1×ΔD'.

Thus, according to the map of driver A preferences shown in FIG. 14A, the rate of change of the target acceleration/deceleration G0 with respect to change in the relative vehicle speed VR is steeper than that of the basic map shown in FIG. 11B. Conversely, according to the map of driver B preferences shown in FIG. 15A the rate of change of the target acceleration/deceleration G0 with respect to change in the inter-vehicle distance deviation ΔD is steeper than that of the basic map shown in FIG. 11C (see FIG. 15B).

And from this it can be seen that, when the own vehicle is being made to follow a vehicle in front, driver A tends to acc/decelerate the own vehicle frequently so as to keep the relative vehicle speed VR constant. And driver B tends to acc/decelerate the own vehicle frequently so as to keep the inter-vehicle distance D constant.

[Third Embodiment]

Figure 16:
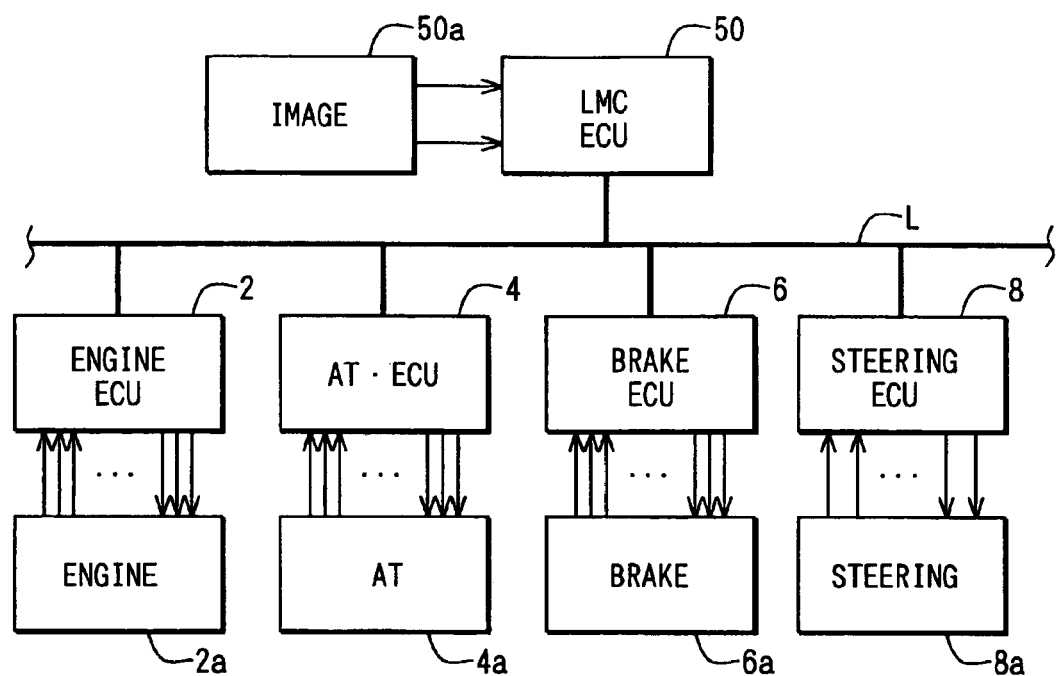
FIG. 16 is a system diagram showing the overall structure of a travel control apparatus of a third embodiment.

Referring to FIG. 16, the travel control apparatus of this embodiment is for performing lane maintenance control (LMC). In accordance with a LMC execution command from a driver, it automatically causes a vehicle to travel along a travel lane on a road, and is constructed around an ECU 50 for LMC (LMC ECU).

This LMC ECU 50 has an image pick-up device 50a (specifically, a camera having an image-processing capability) for detecting a deviation (cross-direction positional deviation) ΔP and the road curvature K of the travel road by picking up an image of the road in front of the vehicle and processing the picked-up image. The deviation ΔP is between the width-direction center position of the travel lane a predetermined distance in front of the vehicle and the width-direction center position of the vehicle.

And, the LMC ECU 50, like the ACC ECU 10 described above, is connected by way of a communication line L to other electronic control units (ECUs) such as an engine ECU 2, an AT ECU 4, a brake ECU 6 and a steering ECU 8. It constitutes a vehicle control system network (a so-called in-vehicle LAN) along with these other ECUs.

And the LMC ECU 50 acquires from the other ECUs connected to it through the communication line L as travel data of the vehicle as follows: a front-rear direction speed (i.e. vehicle speed) V1, a front-rear direction acceleration/deceleration G1, a yaw rate Y and a cross-direction acceleration (cross acceleration) Gy, which are travel data expressing the behavior of the vehicle during vehicle travel; and a steering angle θ, an accelerator opening angle A, a brake depression (brake stroke) B and an AT speed change step S, which are travel data expressing control inputs from the driver during vehicle driving. Using these travel data θ, A, B, S, V1, G1, Y and Gy and the travel environment of the vehicle detected by the image pick-up device 50a (the road curvature K and the cross-direction position deviation ΔP), it executes various control processing for the LMC.

Specifically, the LMC ECU 50, when a LMC execution command is inputted from the driver, computes a target yaw rate Y0 and a target acceleration/deceleration (front-rear direction acceleration/deceleration) G0 as control targets. It also sets a throttle opening angle, an AT speed change step, a brake pressure and a tire angle necessary for controlling the yaw rate Y and the vehicle acceleration/deceleration G1 to these control targets. It then transmits these to the engine ECU 2, the AT ECU 4, the brake ECU 6 and the steering ECU 8.

Here, the steering ECU 8 is for automatically controlling a steering device 8a for controlling the tire angle irrespective of steering operations of the driver, and controls the steering device 8a in accordance with a tire angle transmitted to it from the LMC ECU 50. The other ECUs 2, 4, 6 are the same as those described in the first embodiment, and the LMC ECU 50 and the steering ECU 8, like the other ECUs 2, 4, 6, are each constructed around a microcomputer having a communication capability.

Next, FIG. 17 is a block diagram showing functions with which the LMC ECU 50 is provided for executing the LMC.

As shown in FIG. 17, the LMC ECU 50 has a control data storing part 52 for storing various control data needed for executing the LMC.

This control data storing part 52, in practice, is realized by memory of a microcomputer constituting of the LMC ECU 50. During the LMC execution, control data (target yaw rate computation data c1 to c10 and target acceleration/deceleration computation data d1 to d10) necessary for computing the target yaw rate Y0 and the target acceleration/deceleration G0 using the above-mentioned travel data are stored in the memory in correspondence with travel domains X. The travel domains X are obtained by dividing up the overall travel domain of the vehicle into a plurality (in this embodiment, four). And these control data c1 to c10 and d1 to d10 are inputted to a target yaw rate/target acceleration/deceleration computation part 53 which operates when a LMC execution command has been inputted from the driver.

And, the LMC ECU 50 is provided with a vehicle travel domain determining part 56 for determining to which of the four preset travel domains X (domains 1, 2, 1', 2') the present travel state of the vehicle belongs. The determination result of this vehicle travel domain determining part 56 (a travel domain X) is also inputted to the target yaw rate/target acceleration/deceleration computation part 53.

Figure 18A:
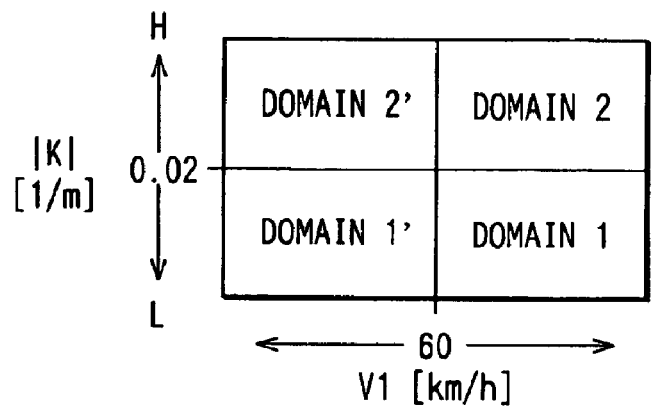
FIGS. 18A and 18B are a table and a diagram showing operations of a travel domain determining part of FIG. 17.

Here, the four travel domains X (domains 1, 2, 1', 2') determined by the vehicle travel domain determining part 56 are preset as shown in FIG. 18A. These four travel domains are obtained by two divisions. The first is dividing the overall travel domain of the vehicle into two travel domains on the basis of whether the vehicle speed V1 showing the behavior of the vehicle is over 60[km/h]. The second is further dividing each of these travel domains into two travel domains on the basis of whether the absolute value of the road curvature K showing the travel environment of the vehicle is over 0.02[1/m] (four travel domains in total).

Figure 18B:
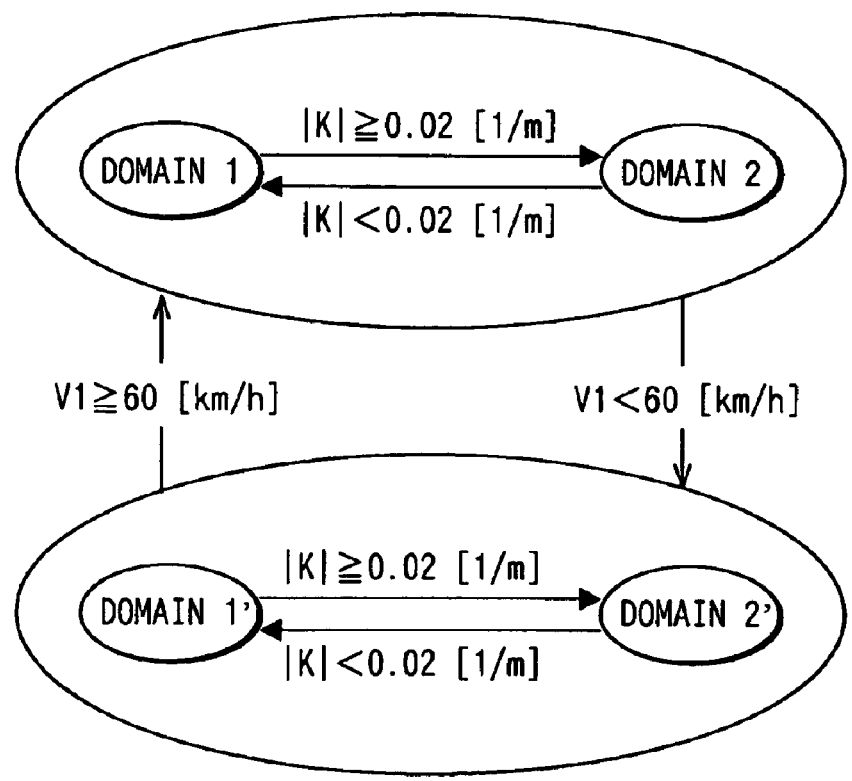

For this, as shown in FIG. 18B, the vehicle travel domain determining part 56 sets domain 1 when the vehicle speed V1 is over 60[km/h] and the absolute value of the road curvature K is less than 0.02[1/m]. It sets domain 2 when the vehicle speed V1 is over 60[km/h] and the absolute value of the road curvature K is equal to or greater than 0.02[1/m]. It sets domain 1' when the vehicle speed V1 is less than 60[km/h] and the absolute value of the road curvature K is less than 0.02[1/m]. And it sets domain 2' when the vehicle speed V1 is less than 60[km/h] and the absolute value of the road curvature K is equal to or greater than 0.02[1/m].

Next, the target yaw rate and acceleration/deceleration computation part 53 takes in from the control data storing part 52 the control data c1 to c10, d1 to d10 corresponding to the travel domain X determined by the vehicle travel domain determining part 56. Using these control data c1 to c10, d1 to d10 and the travel data θ, A, B, S, V1, G1, Y, Gy, K and ΔP acquired from the image pick-up device 50a or the other ECUs, it computes a target yaw rate Y0 and a target acceleration/deceleration G0 in accordance with the following expressions (8), (9).

$$Yo = c1 \times \theta + c2 \times A + c3 \times B + c4 \times S + c5 \times V1 + \qquad (8)$$
$$c6 \times G1 + c7 \times Gy + c8 \times K + c9 \times \Delta P + c10$$

$$G0 = d1 \times \theta + d2 \times A + d3 \times B + d4 \times S + d5 \times V1 + \qquad (9)$$
$$d6 \times Y + d7 \times Gy + d8 \times K + d9 \times \Delta P + d10$$

And the computation results (the target yaw rate Y0 and the target acceleration/deceleration G0) are inputted to a command value computation part 54. The command value computation part 54 sets in accordance with a preset procedure a throttle opening angle, an AT speed change step, a brake pressure and a tire angle necessary for controlling the yaw rate Y and the vehicle acceleration/deceleration G1 to the target yaw rate Y0 and the target acceleration/deceleration G0. It then transmits them to the engine ECU 2, the AT ECU 4, the brake ECU 6 and the steering ECU 8. The command value computation part 54, like the target yaw rate and acceleration/deceleration computation part 53, operates when a LMC execution command has been inputted from the driver.

Next, a control data computation part 60 is for updating the target yaw rate computation data c1 to c10 and the target acceleration/deceleration computation data d1 to d10 stored in the control data storing part 52 in parallel with the actual travel state of the vehicle based on driving operations of the driver. It operates in accordance with a determination result of a sampling suspension determining part 58.

The sampling suspension determining part 58, like the sampling suspension determining part 26 of the embodiments described above, when a proxying/assisting apparatus including the LMC ECU 50 is operating, prohibits digitization (specifically, sampling of travel data) by the control data computation part 30. And when these apparatuses are all not operating, digitization by the control data computation part 60 is permitted. And, the sampling suspension determining part 58 determines whether the driver is carrying out a vehicle operation for emergency avoidance, on the basis of changes in the steering angle θ, the vehicle speed V1 and the vehicle acceleration/deceleration G1 and so on. When an emergency avoidance operation is being carried out, digitization (specifically, sampling of travel data) by the control data computation part 60 is prohibited.

Then, in the control data computation part 60, if digitization is being permitted by the sampling suspension determining part 58, a sampling part 62 samples repeatedly with a predetermined period the travel data θ, A, B, S, V1, G1, Y, Gy, K and ΔP acquired from the image pick-up device 50a and the other ECUs.

The determination result of the vehicle travel domain determining part 56 is also inputted to the control data computation part 60. The sampling part 62 samples the above-mentioned travel data with respect to the present travel domain X determined by the vehicle travel domain determining part 56. And, the sampling part 62, when all the travel data mentioned above cannot be sampled, stops sampling of the travel data at that sampling timing.

And next, the control data computation part 60 is provided with a target yaw rate computation data digitization part 64 and a target acceleration/deceleration computation data digitization part 66, both of which take in by travel domain X the travel data θ, A, B, S, V1, G1, Y, Gy, K and ΔP sampled by the sampling part 62. By carrying out multiple regression analysis in accordance with the multiple regression models of the following expressions (10) and (12), both respectively update the target yaw rate computation data c1 to c10 and the target acceleration/deceleration computation data d1 to d10 held in the control data storing part 52.

$$Y = c1 \times \theta + c2 \times A + c3 \times B + c4 \times S + c5 \times V1 + \qquad (10)$$
$$c6 \times G1 + c7 \times Gy + c8 \times K + c9 \times \Delta P + c10$$

$$G1 = d1 \times \theta + d2 \times An + d3 \times B + d4 \times S + d5 \times V1 + \qquad (11)$$
$$d6 \times Y + d7 \times Gy + d8 \times K + d9 \times \Delta P + d10$$

The target yaw rate computation data digitization part 64 and the target acceleration/deceleration computation data digitization part 66 each have the same functions as the correlation coefficient calculating part 34, the data selection part 36 and the multiple regression coefficient calculating part 38 used to update target acceleration/deceleration computation data in the first embodiment.

The both parts of target yaw rate computation data digitization part 64 and the target acceleration/deceleration computation data digitization part 66 perform multiple regression analysis by travel domain X. Here, a target variable is the yaw rate Y or the vehicle acceleration/deceleration G1. Explanatory variables are travel data, among the travel data by travel domain X sampled by the sampling part 62, of which the single coefficient of correlation with the yaw rate Y or the vehicle acceleration/deceleration G1 is above a predetermined value. The above both parts update the target yaw rate computation data and the target acceleration/deceleration computation data using multiple regression coefficients obtained by that multiple regression analysis.

Accordingly, also in the travel control apparatus of this embodiment, which carries out the LMC, as in the first embodiment, the behavior of the vehicle during the LMC execution can be controlled to behavior preferred by the driver. And, the procedure for computing preference data (multiple regression coefficients) by multiple regression analysis and the procedure for updating the target yaw rate computation data and the target acceleration/deceleration computation data using those preference data are the same as in the first embodiment. These data can be therefore updated to data correctly reflecting the individual preferences of the driver, and finally, a LMC apparatus capable of correctly realizing a travel state preferred by the driver can be built.

And, the control data stored in the control data storing part 52 (the target yaw rate computation data and the target acceleration/deceleration computation data) is updated to data corresponding to the preferences of the driver by the operation of the control data computation part 60. On the other hand, there may be times when this updated control data does not correctly reflect the preferences of the driver. In this embodiment also, as in the embodiments described above, the control data stored in the control data storing part 52 can be therefore initialized, by a control data initialization part 59.

The control data initialization part 59, when the LMC carried out by the LMC ECU 10 has been stopped, determines whether that control stoppage is a temporary stoppage caused by an operation described later or a stoppage caused by a switch operation of the driver. The temporary stoppage is caused by a steering operation, a brake operation or an accelerator operation of the driver, which can be regarded as an operation resulting from the preferences of the driver not being correctly reflected. The stoppage caused by the switch operation can be regarded as a manifestation of the will of the driver wanting to drive with his own operations. The determination is on the basis of a steering control amount, a brake control amount, an accelerator control amount and so on of the driver. It then determines whether the control data stored in the control data storing part 52 is suitable, and when determining that the control data is not suitable, initializes the control data stored in the control data storing part 52.

The functions shown in FIG. 17 are realized by control processing executed by a microcomputer constituting the LMC ECU 50. However, because the specific control processing procedure only differs in the content of the travel data and so on and can be made the same as the control processing explained using FIG. 4 and FIG. 5 in the first embodiment, here an explanation will be omitted.

Although in the embodiments described above cases were explained wherein the invention was applied to a travel control apparatus for performing ACC or LMC, the same results can be obtained by applying the invention in the same way as in the embodiments described above to any apparatus for proxying/assisting driving operation of a vehicle.

And, the travel data used to extract driver preferences in the embodiments described above are one example, and can be suitably changed in consideration of the specifications of the vehicle to which the invention is to be applied and wishes from the driver and so on so that driver preferences can be extracted more simply and correctly.

What is claimed is:

1. A vehicle travel control apparatus for proxying or assisting driving of a driver by automatically controlling a control object without reference to driving operations of a driver during vehicle travel, the apparatus comprising:

detecting means for detecting three or more types of travel data, one of the three or more types of travel data including a behavior of a vehicle during vehicle travel, and another one of the three or more types of travel data including at least one of a driving operation of a driver and a travel environment of the vehicle;

sampling means for sampling all the travel data detected by the detecting means during non-control of the control object by the travel control apparatus;

digitization means for digitizing as preference data a plurality of preferences during vehicle travel of the driver by performing multiple regression analysis with one travel data expressing a behavior of the vehicle as a target variable and the other travel data as explanatory variables among the travel data sampled by the sampling means;

control target computing means for, during control of the control object by the travel control apparatus, computing a control target of the behavior of the vehicle that is the target variable on the basis of, among the travel data detected by the detecting means, the travel data excluding the behavior of the vehicle that is the target variable, and the preference data digitized by the digitization means; and control means for controlling the control object so that the behavior of the vehicle that is the target variable during vehicle travel becomes the control target computed by the control target computing means.

2. A vehicle travel control apparatus according to claim 1, further comprising:

sampling prohibiting means for monitoring the operating state of another travel control apparatus for proxying or assisting driving of a driver and prohibiting operation of the sampling means while the other travel control apparatus is operating.

3. A vehicle travel control apparatus according to claim 1, further comprising:

sampling prohibiting means for determining from the travel data detected by the detecting means whether the vehicle is in a travel state unsuitable for travel safety, and prohibiting operation of the sampling means when the vehicle is in the travel state unsuitable for travel safety.

4. A vehicle travel control apparatus according to claim 1, further comprising:

correlation coefficient computing means for computing respective single coefficients of correlation of, among the travel data sampled by the sampling means, the behavior of the vehicle that is the target variable with the other travel data, wherein the digitization means digitizes the preferences of the driver by performing the multiple regression analysis with travel data of which the absolute value of the single correlation coefficient computed by the correlation coefficient computing means is above a predetermined value as the explanatory variables.

5. A vehicle travel control apparatus of a vehicle according to claim 1, further comprising:

initialization means for, during control of the control object by the travel control apparatus, monitoring the frequency with which control is stopped on the basis of an operation of the driver, and when this frequency is high, returning the preference data to initial values.

6. A vehicle travel control apparatus of a vehicle according to claim 1, wherein the detecting means detects as travel data at least a front-rear direction speed of the vehicle, a yaw rate, a road curvature of the travel road, and a deviation between the width-direction center position of a travel lane a predetermined distance in front of the vehicle and the width-direction centre position of the vehicle, wherein the digitization means digitizes preferences of the driver when the vehicle is traveling along a travel lane, by multiple regression analysis with, among the travel data detected by the detecting means, the yaw rate of the vehicle as a target variable and the other travel data as explanatory variables, wherein the control target computing means computes a target yaw rate in a case where the vehicle is being made to travel along a travel lane, using the preference data digitized by the digitization means and, among the travel data detected by the detecting means, the travel data excluding the yaw rate, and wherein the control means performs automatic traffic lane maintenance control making the vehicle travel automatically along a travel lane, by controlling a control object constituting the steering system of the vehicle so that the yaw rate of the vehicle becomes the target yaw rate.

7. A vehicle travel control apparatus for proxying or assisting driving of a driver by automatically controlling a control object without reference to driving operations of a driver during vehicle travel, the apparatus comprising:

detecting means for detecting three or more types of travel data, one of the three or more types of travel data including a behavior of a vehicle during vehicle travel, and another one of the three or more types of travel data including at least one of a driving operation of a driver and a travel environment of the vehicle;

sampling means for sampling all the travel data detected by the detecting means during non-control of the control object by the travel control apparatus;

digitization means for digitizing as preference data a plurality of preferences during vehicle travel of the driver by performing multiple regression analysis with one travel data expressing a behavior of the vehicle as a target variable and the other travel data as explanatory variables among the travel data sampled by the sampling means;

control target computing means for, during control of the control object by the travel control apparatus, computing a control target of the behavior of the vehicle that is the target variable on the basis of, among the travel data detected by the detecting means, the travel data excluding the behavior of the vehicle that is the target variable, and the preference data digitized by the digitization means;

control means for controlling the control object so that the behavior of the vehicle that is the target variable during vehicle travel becomes the control target computed by the control target computing means; and domain determining means for determining to which of a number of pre-divided travel domains the travel domain the vehicle belongs, using at least one of the travel data detected by the detecting means, wherein the sampling means samples the travel data in correspondence with the travel domains determined by the domain determining means, wherein the digitization means digitizes the preferences of the driver by travel domain, using the travel data for the travel domains sampled by the sampling means, and wherein the control target computing means computes the control target using, of the respective preference data of the travel domains digitized by the digitization means, the preference data corresponding to the present travel domain determined by the domain determining means.

8. A vehicle travel control apparatus of a vehicle according to claim 7, wherein the detecting means detects as travel data at least a front-rear direction acceleration or deceleration of the own vehicle, the relative speed of the own vehicle and a vehicle in front, and an inter-vehicle distance deviation, which is a deviation between the inter-vehicle distance from the own vehicle to the vehicle in front and a target inter-vehicle distance, wherein the digitization means digitizes the preferences of the driver when the vehicle is following a vehicle in front, by multiple regression analysis with, among the travel data detected by the detecting means, the front-rear direction acceleration or deceleration of the own vehicle as the target variable and the other travel data as the explanatory variables, wherein the control target computing means computes the control target of the front-rear direction acceleration or deceleration in a case where the own vehicle is being made to follow a vehicle in front using the preference data digitized by the digitization means and, among the travel data detected by the detecting means, the travel data excluding the front-rear direction acceleration or deceleration of the own vehicle, wherein the control means, by controlling a control object constituting a drive or braking system of the vehicle so that the front-rear direction acceleration or deceleration of the own vehicle becomes the target acceleration or deceleration, performs automatic following control making the own vehicle follow the vehicle in front automatically, and wherein the domain determining means, for the determination of the travel domain, uses the front-rear direction acceleration or deceleration of at least one of the own vehicle and the vehicle in front.

9. A vehicle travel control apparatus of a vehicle according to claim 7, wherein the detecting means detects as travel data at least a front-rear direction acceleration or deceleration of the own vehicle, the relative speed of the own vehicle and a vehicle in front, and an inter-vehicle distance deviation, which is a deviation between the inter-vehicle distance from the own vehicle to the vehicle in front and a target inter-vehicle distance, wherein the digitization means digitizes the preferences of the driver when the vehicle is following a vehicle in front, by multiple regression analysis with, among the travel data detected by the detecting means, the front-rear direction acceleration or deceleration of the own vehicle as the target variable and the other travel data as the explanatory variables, wherein the control target computing means computes the control target of the front-rear direction acceleration or deceleration in a case where the own vehicle is being made to follow a vehicle in front using the preference data digitized by the digitization means and, among the travel data detected by the detecting means, the travel data excluding the front-rear direction acceleration or deceleration of the own vehicle, wherein the control means, by controlling a control object constituting a drive or braking system of the vehicle so that the front-rear direction acceleration or deceleration of the own vehicle becomes the target acceleration or deceleration, performs automatic following control making the own vehicle follow the vehicle in front automatically, and wherein the domain determining means, for the determination of the travel domain, uses the front-rear direction relative acceleration of the own vehicle with respect to the vehicle in front.

10. A vehicle travel control apparatus for proxying or assisting driving of a driver by automatically controlling a control object without reference to driving operations of a driver during vehicle travel, the apparatus comprising:

detecting means for detecting three or more types of travel data, one of the three or more types of travel data including a behavior of a vehicle during vehicle travel, and another one of the three or more types of travel data including at least one of a driving operation of a driver and a travel environment of the vehicle;

sampling means for sampling all the travel data detected by the detecting means during non-control of the control object by the travel control apparatus;

digitization means for digitizing as preference data a plurality of preferences during vehicle travel of the driver by performing multiple regression analysis with one travel data expressing a behavior of the vehicle as a target variable and the other travel data as explanatory variables among the travel data sampled by the sampling means;

control target computing means for, during control of the control object by the travel control apparatus, computing a control target of the behavior of the vehicle that is the target variable on the basis of, among the travel data detected by the detecting means, the travel data excluding the behavior of the vehicle that is the target variable, and the preference data digitized by the digitization means; and control means for controlling the control object so that the behavior of the vehicle that is the target variable during vehicle travel becomes the control target computed by the control target computing means;

wherein the detecting means detects as travel data at least a front-rear direction acceleration or deceleration of the own vehicle, the relative speed of the own vehicle and a vehicle in front, and an inter-vehicle distance deviation, which is a deviation between the inter-vehicle distance from the own vehicle to the vehicle in front and a target inter-vehicle distance, wherein the digitization means digitizes the preferences of the driver when the vehicle is following a vehicle in front, by multiple regression analysis with, among the travel data detected by the detecting means, the front-rear direction acceleration or deceleration of the own vehicle as the target variable and the other travel data as the explanatory variables, wherein the control target computing means computes the control target of the front-rear direction acceleration or deceleration in a case where the own vehicle is being made to follow the vehicle in front using the preference data digitized by the digitization means and, among the travel data detected by the detecting means, the travel data excluding the front-rear direction acceleration or deceleration of the own vehicle, and wherein the control means, by controlling a control object constituting a drive or braking system of the vehicle so that the front-rear direction acceleration or deceleration of the own vehicle becomes the target acceleration or deceleration, performs automatic following control making the own vehicle follow the vehicle in front automatically.

11. A vehicle travel control apparatus of a vehicle according to claim 10, wherein the detecting means detects the inter-vehicle distance deviation by detecting respectively the front-rear direction speed of the own vehicle and the inter-vehicle distance between the own vehicle and the vehicle in front, computing a target inter-vehicle distance from the front-rear direction speed of the own vehicle, and obtaining the difference between this target inter-vehicle distance and the detected inter-vehicle distance.

12. A vehicle travel control apparatus of a vehicle according to claim 11, wherein the digitization means digitizes, in addition to the preference data used by the control target computing means for computing the target acceleration or deceleration, second preference data expressing a relationship between the inter-vehicle distance and the own vehicle speed in a case where the vehicle is following a vehicle in front, by single regression analysis with the inter-vehicle distance between the own vehicle and the vehicle in front detected by the detecting means as the target variable and the front-rear direction speed of the own vehicle as the explanatory variable, and wherein the detecting means computes the target inter-vehicle distance on the basis of the second preference data and the front-rear direction speed of the own vehicle.

13. A method for at least one of proxying and assisting vehicle driving of a driver by automatically controlling a control object without reference to driving operations of a driver during vehicle travel, the method comprising:

detecting at least three travel data including:
 (i) first travel data of a behavior of the vehicle during vehicle travel, and
 (ii) other travel data including at least one of a driving operation of a driver and a travel environment of the vehicle;

sampling all the travel data detected during non-control of the control object;

digitizing a plurality of vehicle-travel preferences of the driver by determining relationships of the sampled first travel data with the sampled other travel data;

computing a control target of the behavior of the vehicle, during control of the control object, based on the digitized vehicle-travel preferences and the sampled other travel data; and controlling the control object so that the behavior of the vehicle during vehicle travel becomes the computed control target;

wherein the vehicle-travel preferences of the driver are digitized by using a multiple regression analysis with the sampled first travel data assigned to a target variable and the sampled other travel data assigned to explanatory variables.

14. A method for proxying or assisting vehicle driving of a driver by automatically controlling a control object without reference to driving operations of a driver during vehicle travel, the method comprising:

detecting at least three travel data including:
 (i) first travel data of a behavior of the vehicle during vehicle travel, and
 (ii) second travel data including at least one of a driving operation of a driver and a travel environment of the vehicle;
 (iii) third travel data including travel data other than the first and second travel data;

sampling all the travel data detected while automatic control of the control object is neither performed nor selected;

digitizing a plurality of vehicle-travel preferences of the driver by determining relationships of the sampled first travel data with at least the sampled second and third travel data;

computing a control target of the behavior of the vehicle, during control of the control object, based on the digitized vehicle-travel preferences and at least the sampled second and third travel data; and controlling the control object so that the behavior of the vehicle during vehicle travel becomes the computed control target;

wherein the vehicle-travel preferences of the driver are digitized by using a multiple regression analysis with the sampled first travel data assigned to a target variable and at least the sampled second and third travel data assigned to explanatory variables.

15. A vehicle travel control apparatus for proxying or assisting driving of a driver by automatically controlling a control object without reference to driving operations of a driver during vehicle travel, the apparatus comprising:

a detector which detects three or more types of travel data, the three or more types including (i) first travel data of a first travel data type corresponding to a behavior of a vehicle during vehicle travel, (ii) second travel data of a second travel data type corresponding to a driving operation of a driver or a travel environment of the vehicle, and (iii) third travel data of a third data travel type corresponding to travel data other than the first travel data and second travel data;

a sampler which samples all the travel data detected by the detector while automatic control of the control object is neither performed nor selected;

a digitizer which digitizes a plurality of preferences of the driver during vehicle travel by performing multiple regression analysis with the first travel data expressing a behavior of the vehicle as a target variable and the second and third travel data as explanatory variables among the travel data sampled by the sampler;

a control target computer which computes, during control of the control object by the travel control apparatus, a control target of the behavior of the vehicle that is the target variable on the basis of the second and third travel data and the digitized preference data; and a controller which controls the control object so that the behavior of the vehicle that is the target variable during vehicle travel becomes the control target computed by the control target computer.

* * * * *